US008811772B2

(12) United States Patent
Yang

(10) Patent No.: US 8,811,772 B2
(45) Date of Patent: Aug. 19, 2014

(54) MAPPING EVALUATING FOR SPATIAL POINT SETS

(76) Inventor: Tianzhi Yang, Harrison, NJ (US)

( * ) Notice: Subject to any disclaimer, the term of this patent is extended or adjusted under 35 U.S.C. 154(b) by 214 days.

(21) Appl. No.: 13/590,331

(22) Filed: Aug. 21, 2012

(65) Prior Publication Data

US 2012/0314974 A1 Dec. 13, 2012

(51) Int. Cl.
*G06K 9/32* (2006.01)
*G06T 7/00* (2006.01)
*G06K 9/62* (2006.01)

(52) U.S. Cl.
CPC ..... *G06K 9/6211* (2013.01); *G06T 2207/20164* (2013.01); *G06T 7/0028* (2013.01)
USPC ........... 382/294; 382/277; 382/291; 382/302; 358/537; 358/540; 358/450

(58) Field of Classification Search
USPC ................. 382/277, 278, 284, 291, 294, 302; 358/537, 540, 450
See application file for complete search history.

(56) References Cited

U.S. PATENT DOCUMENTS

| 6,272,245 | B1 * | 8/2001 | Lin ................................ 382/195 |
| 6,640,201 | B1 | 10/2003 | Hahlweg |
| 6,919,892 | B1 * | 7/2005 | Cheiky et al. .................. 345/473 |
| 7,003,156 | B1 * | 2/2006 | Yamamoto et al. ........... 382/181 |
| 7,373,275 | B2 | 5/2008 | Kraft |
| 8,144,947 | B2 * | 3/2012 | Kletter .......................... 382/124 |
| 8,553,037 | B2 * | 10/2013 | Smith et al. .................... 345/473 |
| 2010/0310177 | A1 | 12/2010 | Xiong et al. |

OTHER PUBLICATIONS

Yang and Keyes (2008). An Affine Energy Model for Image Registration Using Markov Chain Monte Carlo. Submitted to SIAM Journal of Imaging Sciences in Jul. 2008, in Mar. 2009 we were told that it was rejected. In the mean while it has been placed on the first author's webpage (http://www.columbia.edu/~ty2109) for a while and then removed.

Linden (2011). A Triangulation-Based Approach to Nonrigid Image Registration. Masters Thesis (Wright State University). [online] [retrieved on Jan. 31, 2012] Retrievable from http://rave.ohiolink.edu/etdc/view?acc num=wright1310502150.

Seetharaman and Gasperas, et al. (2000). A piecewise affine model for image registration in nonrigid motion analysis. Image Processing, 2000. Proceedings. 2000 International Conference on.

Ourselin et al. (2001). Reconstructing a 3D structure from serial histological sections. Image and Vision Computing. vol. 19, Issues 1-2, Jan. 2001, pp. 25-31.

Deza and Deza (2009). Encyclopedia of Distances. Springer-Verlag Berlin Heidelberg. pp. 221-225.

(Continued)

*Primary Examiner* — Yosef Kassa

(57) ABSTRACT

A computer implemented method for evaluating a one-to-one mapping between a first spatial point set and a second spatial point set in nD comprising the steps of receiving a first and a second spatial point sets in nD and a one-to-one mapping between the two spatial point sets; generating a pair of mapped agreeable (n+1)-combinations in the first point set; computing two affine transformations that transform the pair of mapped agreeable (n+1)-combinations to correspondents in the second point set; computing the difference of the left sub-matrices of the two affine transformations; and computing a local distance measure based on the difference of the left sub-matrices of the two affine transformations.

20 Claims, 12 Drawing Sheets

(56) References Cited

OTHER PUBLICATIONS

Singular value decomposition. In Wikipedia. Retrieved Aug. 5, 2012, from http://en.wikipedia.org/wiki/Singular_value_decomposition.

Square root of a 2 by 2 matrix. In Wikipedia. Retrieved Aug. 6, 2012, from http://en.wikipedia.org/wiki/Square_root_of_a_2_by_2_matrix.

Square root of a matrix. In Wikipedia. Retrieved Aug. 8, 2012, from http://en.wikipedia.org/wiki/Square_root_of_a_matrix.

* cited by examiner

MAPPING EVALUATING FOR SPATIAL POINT SETS

CROSS-REFERENCE TO RELATED APPLICATIONS

This application is related to U.S. application Ser. No. 13,487,219 filed on Jun. 3, 2012.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Prior Art

The following is a tabulation of some prior art that presently appears relevant:

U.S. PATENTS

| Patent Number | Kind Code | Issue Date | Patentee |
| --- | --- | --- | --- |
| 6,640,201 | B1 | Oct. 28, 2003 | Hahlweg |
| 7,373,275 | B2 | May 13, 2008 | Kraft |
| 20100310177 | A1 | Dec. 9, 2010 | Xiong et al. |

Nonpatent Literature Documents

Yang, Tianzhi and Keyes, David E. (2008). An Affine Energy Model for Image Registration Using Markov Chain Monte Carlo. Submitted to SIAM Journal of Imaging Sciences in July 2008, in March 2009 we were told that it was rejected, in the mean while it has been placed on the first author's web page (http://www.columbia.edu/~ty2109) for a while, then removed.

Linden, Timothy R. (2011). A Triangulation-Based Approach to Nonrigid Image Registration. Masters Thesis (Wright State University). [online] [retrieved on Jan. 31, 2012] Retrievable from http://rave.ohiolink.edu/etdc/view?acc_num=wright1310502150.

Seetharaman, G., G. Gasperas, et al. (2000). A piecewise affine model for image registration in nonrigid motion analysis. Image Processing, 2000. Proceedings. 2000 International Conference on.

Ourselin, S., A. Roche, et al. (2001). Reconstructing a 3D structure from serial histological sections. Image and Vision Computing 19(1-2): 25-31.

DEZA and DEZA (2009). Encyclopedia of Distances. Springer-Verlag Berlin Heidelberg. Pages 311-315.

Singular value decomposition. In Wikipedia. Retrieved Aug. 5, 2012, from http://en.wikipedia.org/wiki/Singular_value_decomposition Square root of a 2 by 2 matrix. In Wikipedia. Retrieved Aug. 6, 2012, from http://en.wikipedia.org/wiki/Square_root_of_a_2_by_2_matrix Square root of a matrix. In Wikipedia. Retrieved Aug. 8, 2012, from http://en.wikipedia.org/wiki/Square_root_of_a_matrix In image registration, one wants to align a template image with a reference image. In feature-based image registration methods, a finite set of feature points is selected from each image, then the features points of the template image are mapped to those of the reference image. A feature point typically represents an outstanding feature of an image, e.g. a corner of a shape, local maxima and minima of differences of Gaussians, and a point of maximal curvature. Feature points are usually 2D or 3D spatial points that carry with them feature specific information in addition to their coordinates.

Feature-based image registration methods can be used when deformations are relatively large; on the other hand, non-parametric registration methods, such as the elastic and the fluid registration methods, are used when deformations are small. Because of this, feature-based registration is sometimes carried out as a pre-processing step that precedes non-parametric registration.

Besides, the matching of spatial point sets is an important problem in various computer vision and pattern recognition areas such as motion tracking, shape matching, and industrial inspection. Often the captured signal is extracted to a spatial point set and the problem becomes detecting a geometric pattern from the point set. This may be accomplished by matching the extracted point set with a model point set.

The matching usually involves minimizing an energy function, that is, select from a set of candidate mappings a mapping that minimizes the energy function. Since the problem has received a lot of attentions in the computer vision community, many energy functions has been proposed. For example, the Hausdorff distance has been used by many authors to match two point clouds. Another widely used distance is the bottleneck distance, which is the maximum distance between any two matched points.

Given an energy function, sometimes an optimal mapping can be obtained. For example when the number of candidate mappings is small, then one can do an exhaustive search. Efficient optimization methods are applicable when the energy function is linear with linear constraints, or the energy function is quadratic. On the other hand, if the number of candidate mappings is large and the energy landscape is rough, that is, containing lots of local minima (or maxima), then sometimes the practice is to employ some heuristics. Examples of such heuristics are Simulated Annealing (SA), Generic Algorithm (GA), Tabu Search (TS), and the greedy algorithm. It is understood that heuristics usually are not guaranteed to generate the best solutions for complex problems, hence most of the times the target is rather a solution that is hopefully close to the best one. In recent years, hybrid methods that combine two or more methods have been applied in different areas such as the designing of mobile networks and power systems. For example, a greedy simulated annealing algorithm combines a greedy local search method with SA to improve the convergence speed.

Underlying lots of existing methods for matching spatial point sets is the assumption that either it is the same set of objects that appear in both images and their spatial arrangements are by and large the same (e.g. medical images, static images of landscape, buildings, mountains), and noises, which may come from occlusions, distortions, or relative motions, are relatively small. In some situations such assumption is valid, but new methods need to be developed in less ideal situations. For example, when a template image presents two cars and a reference image shows only one, when objects undergo relative motions, or when objects are partially occluded in a reference image while they are fully revealed in a template image.

In medical imaging literatures, matching of point sets usually precedes finer registration techniques that establishes pixel-level correspondences. The matching of point sets is usually carried out by a least square regression or its variations, based on the assumption that there exists a global affine transformation. For example, in Seetharaman (2000), the global affine transformation is estimated by using a scatter matrix, which measures how the point sets as a whole are distributed in space; then local points are matched by a nearest-neighbor technique. In an iterative scheme, for example in the Block matching method in Ourselin (2001), the regression step could be repeated for multiple times. In image alignment, for example in "Distinctive Image Features from Scale-Invariant Keypoints" by Lowe (Int. J. Comput. Vision 60(2): 91-110, 2004), candidate point correspondences are first identified by comparing features, then a least square problem is solved to extract the parameters of an affine-transformation, again based on the assumption that most candidates more or less comply with a global affine transformation.

Xiong et al (2004) use a control network of super points, the disclosed embodiment is not scale invariant. Hahlweg (2003) discloses a method that uses transformation equations whose parameters measure similarities between point sets. The method is affine-invariant if the transformation equation is carefully chosen. Finally, Kraft (2008) computes a force field that perturbs one point set to align with the other. Instead of worrying about the mappings between individual points, another school looks into minimizing the Hausdorff distances between point clouds. Implementations of this approach can be found in "Efficient Visual Recognition Using the Hausdorff Distance" by Rucklidge (Springer-Verlag New York, Inc., 1996) and "Comparing point clouds" by Mémoli (Proceedings of the 2004 Eurographics/ACM SIGGRAPH symposium on Geometry processing. Nice, France, ACM: 32-40).

In Yang and Keyes (2008), an affine energy model for matching point sets using SA is presented. There, a smoothness constraint is defined in terms of the Euclidean distance between the elements of the matrices of pairs of affine transformations, where the energy function depends only on the location of the points. SA is applied to solve the registration problem by iteratively removing and inserting cross-edges. Its potential in avoiding local minima in the presence of global affine and nonlinear transformations is demonstrated by comparing it with non-parametric registration and affine registration models. Timothy (2011) also uses the Euclidean distance to compare affine transformations for the purpose of image registration. But since an affine transformation is a mixture of rotation, scaling, displacement and shearing, which are mingled together in the elements of an affine transformation matrix, the significant elements of the matrix do not have much physical meaning, Euclidean distance between affine transformation matrices does not necessarily accurately reflect the similarities between the affine transformations.

In my previous patent application (U.S. application Ser. No. 13,487,219 filed on Jun. 3, 2012), instead of relying on the Euclidean distance, various spatial agents are defined and transformed so that distance measures are computed by comparing transformed spatial agents.

However when two mapped (n+1)-combinations have less than n points in common, sometimes a spatial agent can not be uniquely chosen, not only because various basis and directions can be used, but also because the computed local distance measures computed may not be rotation invariant.

For example referring to FIG. 10, where there are two 3-combinations (384, 392, 386) and (386, 388, 390) sharing a common vertex 386, a points-of-action can not be uniquely chosen: both the points-of-action consisting of points 412*a*, 414*a* and the points-of-action consisting of points 412*b*, 414*b* can be chosen according to the procedure described in the alternative embodiment in my previous patent application where two mapped (n+1)-combinations have (n−1) points in common and the spatial agent is a points-of-action.

Furthermore, in some situations, for example when two mapped 3-combinations share only one point and a points-of-action is employed, (referring to the same alternative embodiment in my previous U.S. patent application Ser. No. 13,487,219 filed on Jun. 3, 2012), distance measures may not be rotation invariant: if we use a fixed set of basis vectors (e.g., the standard basis in 2D), and assume the two point sets are defined on the same plane then rotating the plane (thus rotating the points) will change values of distance measures.

SUMMARY

The present application addresses evaluating a mapping between two spatial point sets. It can be used as a post-processing unit for evaluating mappings generated by algorithms that match point sets, or work together with an optimization unit to match two point sets.

Embodiments describe a system for evaluating a one-to-one mapping between a first spatial point set and a second spatial point set in nD, the system comprising a programmable processor and a memory coupled with the programmable processor and the memory embodying information indicative of instructions that cause the programmable processor to perform operations comprising receiving a first and a second spatial point sets in nD and a one-to-one mapping between the two spatial point sets; generating a pair of mapped agreeable (n+1)-combinations in the first point set; computing two affine transformations that transform the pair of mapped agreeable (n+1)-combinations to correspondents in the second point set; computing the difference of the left sub-matrices of the two affine transformations; computing a local distance measure based on the difference.

Embodiments describe a method of using a computer processor to evaluate a one-to-one mapping between a first spatial point set and a second spatial point set in nD, where the method comprises receiving a first and a second spatial point sets in nD and a one-to-one mapping between the two spatial point sets; using the computer processor to generate a pair of mapped agreeable (n+1)-combinations in the first point set; using the computer processor to compute two affine transformations that transform the pair of mapped agreeable (n+1)-combinations to correspondents in the second point set; using the computer processor to compute the difference of the left sub-matrices of the two affine transformations; using the computer processor to compute a local distance measure based on the difference.

Embodiments describe a computer readable storage medium tangibly embodying a computer readable program code having computer readable instructions which when implemented, cause a computer to carry out the steps of a method comprising receiving a first and a second spatial point sets in nD and a one-to-one mapping between the two spatial point sets; generating a pair of mapped agreeable (n+1)-combinations in the first point set; computing two affine transformations that transform the pair of mapped agreeable (n+1)-combinations to correspondents in the second point set; computing the difference of the left sub-matrices of the two affine transformations; computing a local distance measure based on the difference.

Embodiments describe a system for evaluating a one-to-one mapping between a first spatial point set and a second spatial point set in nD, the system comprising means for receiving a first and a second spatial point sets in nD and a one-to-one mapping between the two spatial point sets; means for generating a pair of mapped agreeable (n+1)-combinations in the first point set; means for computing two affine transformations that transform the pair of mapped agreeable (n+1)-combinations to correspondents in the second point set; means for computing the difference of the left sub-matrices of the two affine transformations; means for computing a local distance measure based on the difference.

These and other features, aspects, and advantages of the present invention will become better understood with reference to the following description, appended claims, and accompanying drawings.

DRAWINGS

Figures

DETAILED DESCRIPTION

Figure 1:
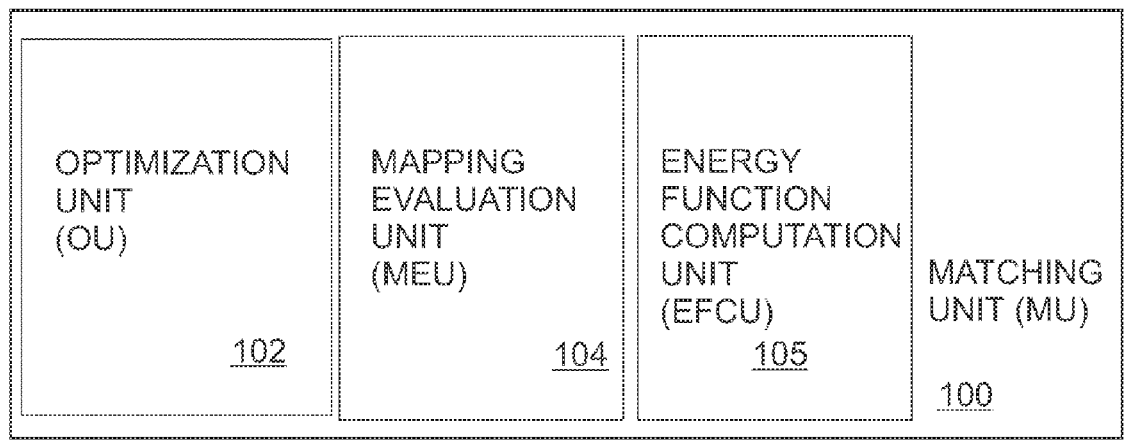
FIG. 1 is a block diagram of an illustrative embodiment of a matching unit.

The affine transformation in nD is a line-preserving transformation from $R^n$ to $R^n$ that preserves parallelism and division-ratio. An affine transformation T acting on a point whose coordinate vector is $\vec{x}=[x_1, \ldots, x_n]^T \epsilon R^n$ is denoted by $T(\vec{x})$ that can either be written as $$A(T)\vec{x} + \vec{t}(T)$$

where $A(T)$ is an n-by-n matrix and $\vec{t}(T)$ is an n-by-1 vector, both uniquely determined by T, or represented as a single matrix-vector multiplication in homogeneous coordinates as:

$$\begin{bmatrix} A(T) & \vec{t}(T) \\ 0 & 1 \end{bmatrix} \begin{bmatrix} x_1 \\ \vdots \\ x_n \\ 1 \end{bmatrix}$$

In practice in homogeneous coordinates a point is usually represented in its standard form, which means that its element corresponding to the extra dimension obtained by embedding into a projective space is 1; however, it is understood that in homogeneous coordinates two vectors are viewed as equal if one can be obtained by multiplying the other by a non-zero scalar.

In this invention, it is to be understood that a spatial point is a point of interest in nD, n=2, 3. The point of interest is extracted from a digital image using feature extractors (e.g. SIFT, Canny detector, and various corner and blob detectors), inserted into the space (by assigning coordinates to the point) of the digital image by human operators through computer user interfaces, or inserted into the space of the digital image by computer algorithms. To each received spatial point there is in the input at least its coordinates, which is denoted by $loc(x_i)$ for a spatial point labeled by $x_i$. Whether $loc(\cdot)$ is a homogeneous or an inhomogeneous coordinate vector depends on the context. Digital images comprise images suitable to be processed and displayed by a computer and acquired by various acquiring devices such as medical imaging machines, digital cameras, or any other devices that converts physical signals into images reflecting the spatial distribution of the physical signals. For example the MRI machine that uses a powerful magnetic field to produce greyscale images, and the infrared camera that generates images based on infrared radiations.

For an affine transformation T, I will refer to $A(T)$ as the left sub-matrix of T, and $\vec{t}(T)$ as the displacement component of T. An affine transformation is said to be nD if the dimension of the associated space is $R^n$. The representation of an nD affine transformation in homogeneous coordinates is an (n+1)-by-(n+1) matrix. We use $T(\vec{x})$ to denote the image obtained by applying an affine transformation T to a point $\vec{x}$, and $A(T)(\vec{x})$ to denote the image obtained by applying the left sub-matrix of T to $\vec{x}$. Similarly, if s is a set, then T(s) denotes the set obtained by applying the affine transformation T to each point of the set, and $A(T)(s)$ denotes the set obtained by applying the left sub-matrix of T to each point of the set s.

Given two affine transformations $T_1$, $T_2$, the difference of the left sub-matrices of $T_1$, $T_2$ is defined to be either $A(T_1)-A(T_2)$ or equivalently $A(T_1-T_2)$.

FIG. 1 is a block diagram of an exemplary embodiment of a matching unit (MU) 100. As shown in FIG. 1, MU 100 includes an optimization unit (OU) 102, a mapping evaluation unit (MEU) 104, and an energy function computation unit (EFCU) 105.

In block 102, OU 102 receives two spatial point sets in nD, then generates a multiple of one-to-one mappings between the two point sets. To fix notation, we call one of the two spatial point sets the template point set $V_1$, and the other the reference point set $V_2$. In this embodiment, already one point set is designated the template point set and the other is designated the reference point set. Alternatively, OU 102 can be configured to arbitrarily chose one point set as the template point set and the other as the reference point set.

In this document, a one-to-one mapping is a correspondence between two point sets such that for each point in one point set there is at most one corresponding point in the other. The domain of the one-to-one mapping is a subset of the first point set. A point of the template point set, which we will call a template point, is either an isolated point, or is associated with a unique point in the reference point set, in which case we say there is an cross-edge between the template point and the reference point. The same applies to a point of the reference point set, which we will call a reference point. A one-to-one mapping between two point sets in $R^n$ can also be represented by a displacement field, where to each point of a subset of the first point set there is attached a displacement vector, such that the point's correspondent's location can be calculated by adding the displacement vector to the point's location. In either point set a point that has no correspondent is called an isolated point. Also, two point sets together with a one-to-one mapping between them is defined as a configuration. A sub-configuration is a configuration that contains a subset of the points and the correspondences of an original configuration. "A pair of corresponding points" refers to two points that are correspondents of each other.

An energy function (a.k.a. objective function, cost function, distance measure, similarity measure, fitness measure) associates each configuration with a score in R. If the configuration is a sub-configuration, the scalar is said to be a local energy score, otherwise we will call it an overall energy score. A local (resp:overall) energy score comprises one or more local (resp:overall) distance measures (defined below) and zero or more additional terms (i.e., not computed from transformed spatial agents). Hereinafter, E(•) will denote an energy function. An energy function is often used to evaluate the desirability of a configuration. In this embodiment we assume that lower energy scores are more desirable; on the other hand, if higher energy scores are more desirable, one can simply flip the signs.

Figure 3:
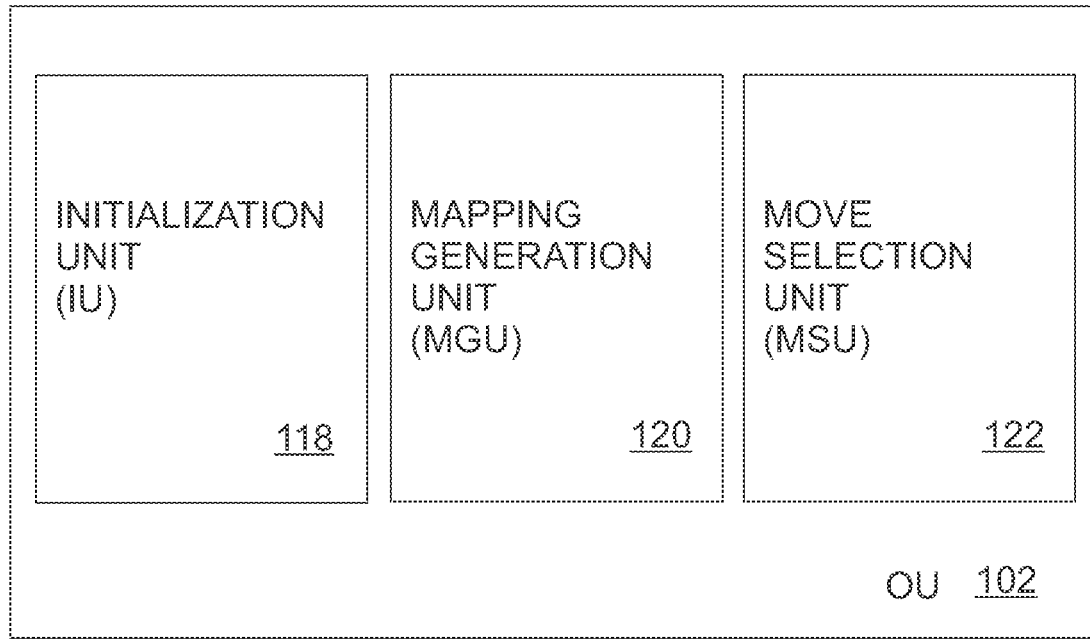
FIG. 3 is a block diagram of an illustrative embodiment of an optimization unit shown in FIG. 1.

FIG. 3 is a block diagram of an illustrative embodiment of the OU 102 shown in FIG. 1. As shown in FIG. 3, OU 102 comprises an initialization unit (IU) 118, a mapping generation unit (MGU) 120, and a move selection unit (MSU) 122. Upon receiving two point sets, OU 102 generates multiple candidate mappings between the two point sets, then select among the candidate mappings one with the lowest energy score. Alternatively, it is possible to select more than one candidate mappings. Such examples can be found in multi-objective optimization.

A generation is a set consisting of one or more configurations. In block 118, IU 118 generates a first generation containing one or more configurations. In block 120, MGU 120 generates one or more configurations from the current generation. In block 122, MSU 122 selects one or more configurations either from the newly generated configurations or from the union of the newly generated configurations and the individuals of the current generation. MSU 122 then updates the current generation so that it consists of the selected configurations.

I contemplate that in this embodiment Simulated Annealing (SA) is used in OU 102 for iteratively generating multiple one-to-one mappings. The SA algorithm used in some embodiments is briefly listed below:

1. At IU 118, an initial configuration is generated by a random walk in the configuration space, and a starting temperature is chosen.
2. At the current temperature, MGU 120 performs a series of moves. For each move, MEU 104 and EFCU 105 evaluate the difference between two energy scores $\Delta E = E_2 - E_1$ (usually the difference can be computed by evaluating one or more sub-configurations instead of computing energy scores for $E_2$ and $E_1$ separately), where $E_2$ is the energy score for the new configuration after the move and $E_1$ is the energy score for the original (current) configuration before the move. At MSU 122 each move is accepted or rejected according to a certain acceptance criterion. If a move is accepted, the current configuration is set to be the new configuration, otherwise no update is performed and the current configuration is still the original configuration.
3. OU 102 updates the current temperature according to a schedule.
4. If the current temperature is lower than some end value (or if no moves has been accepted for a predetermined period of time), print a good configuration (a good configuration in our context is defined to be either the final configuration or the configuration with the lowest energy score so far) and end the algorithm; otherwise go back to step 2.

In the above algorithm, each generation contains only one configuration. Alternatively, in ensemble based simulated annealing, or in some parallel simulated annealings where discovered information are exchanged regularly, each generation may contain multiple configurations.

At IU 118, I contemplate that in this embodiment, the initial configuration is created by performing a random walk (i.e. every move is accepted) in the space of configurations and record the last configuration as the initial configuration. Alternatively, an initial configuration can be created in various ways. In one embodiment an initial configuration is a configuration where every point is isolated, in another embodiment an initial configuration is created by select randomly for each template point a reference point from the bag of reference points, where the bag of reference points contains all points in the reference point set plus a null point, where a template point is mapped to a null point if and only if the template point is an isolated point. The selection is without replacement if the selected reference point is not the null point, and with replacement otherwise.

I contemplate that in this embodiment, the initial temperature is set to 10 max|$\Delta E$|, where max|$\Delta E$| is obtained by recording the maximum energy difference max $\Delta E$ during a random walk in the space of configurations. Alternatively, an initial temperature can be determined in various ways. For example, the initial temperature can be set to the max energy score max|E| occurred during a random walk, the mean of all energy scores measured during a random walk, or simply a predetermined value.

In OU 102, I contemplate that in this embodiment, the cooling schedule is constructed so that the current temperature is updated according to $T_{current}=T_{current}*f$, where f is a cooling factor usually in the range of [0.8, 0.999]. Alternatively, there are various cooling schedules. In one embodiment, $T_{current}=a-b*T_{current}$, where a is the initial temperature, and b is a decrement factor chosen in the interval [0.01; 0.2]. In another embodiment, a non-monotone cooling schedule, for example the bouncing approach introduced in "Bouncing towards the optimum: improving the results of Monte Carlo optimization algorithms" by Schneider, Morgenstern, and Singer (1998, Phys Rev. E 58, 5085), is used.

In MSU 122, I contemplate that in the current embodiment a move from a first configuration $c_1$ to a second configuration $c_2$ is accepted if $r<E-\Delta E/T$, where $\Delta E=E(c_2)-E(c_1)$ is the difference in energy, T is the current temperature, and r is a uniformly distributed random variable in [0,1]. This kind of acceptance criteria is what defines Simulated Annealing. Alternatively, for example, in one embodiment Threshold Accepting is implemented in OU 102, and the acceptance criterion is replaced by $\Delta E<\theta$, where $\theta$ is a threshold that is lowered gradually from a large value to 0.

To use simulated annealing (and other improvement heuristics), we need to define moves that generates one configuration from another. Once such moves are defined, if a configuration x can be reached from a configuration y in one move, we say x is a neighbor of y, denoted by $x \in N(y)$. Notice that $x \in N(y)$ doesn't necessarily mean $y \in N(x)$.

In MGU 120, I contemplate that in this embodiment the basic moves are "Cut"s and "Nit"s:

In a Cut step, a cross-edge of a configuration is chosen at random (i.e., according to a probability distribution), then the chosen cross-edge is removed. The new configuration has one cross-edge less than the original one.

In a Nit step, an isolated template point and an isolated reference point are chosen at random. A cross-edge between the two points is added. The new configuration has one cross-edge more than the original one.

Here we define three moving classes. In a moving class A, each move can either be a Cut or be a Nit:

1. According to a probability distribution, choose either an existing cross-edge $e=(v_1, v_2)$, or an isolated point $v_3$ from $V_1$ and an isolated point $v_4$ from $V_2$. If a cross-edge is chosen, go to step 2. Otherwise go to step 3.
2. Cut e. End.
3. Nit a cross-edge $(v_3, v_4)$. End.

With moving class B, more than one Cuts can occur in a single move. At each step we randomly choose a pair of points $(v_1, v_2)$ from $V_1 \times V_2$, the Cartesian product of these two point sets, then:

1. If $(v_1, v_2)$ is already connected by a cross-edge, disconnect it and End. Otherwise go to step 2.
2. If $v_1$ is connected to another point $v'_2$, $v'_2 \neq v_2$, Cut $(v_1, v'_2)$. Similarly if $v_2$ is connected to a point $v'_1$, $v'_1 \neq v_1$, Cut $(v'_1, v_2)$. Go to step 3.
3. Nit $v_1$ and $v_2$. End.

In a moving class C, a move can include a Cut and a Nit, but not two Cuts. Let N be the set of isolated reference points. First a template point is chosen at random. If the chosen template point is a mapped point, then either a reference point from N is chosen (without replacement) to replace the correspondent of the chosen template point, the correspondent is put back into N, or the cross-edge is removed. The former case involves a Cut and a Nit while the latter involves only a Cut. A random number generator is used to choose between the two cases; on the other hand, if the chosen template point is not a mapped point, then one reference point from N is chosen and a Nit step is performed to connect the two points.

Besides what is described above, Simulated Annealing has many variations, and some parameters has to be tuned. See chapter one of "handbook of metahuristics" (Gendreau, Michel and Potvin, Jean-Yves, 2010, Springer, N.Y.) for a summary.

Alternatively, the greedy algorithm can be used:
1. At IU 118, an initial configuration is generated by a random walk in the configuration space.
2. MGU 120 generates all neighbors of the current configuration.
3. Does the current configuration have better neighbors (i.e., a neighbor configuration with a lower energy score)? If yes, go to step 4, otherwise go to step 5.
4. MSU 122 selects the best neighbor and updates the current configuration with the best neighbor. Go back to step 2.
5. Print the current configuration, End.

Sometimes the whole process is repeated for multiple times to generate a multiple of random initial configurations, and the multiple results are compared to obtain the best result.

Alternatively, one can select the first better neighbor instead of the best neighbor:
1. At IU 118, an initial configuration is generated by a random walk in the configuration space.
2. MGU 120 generates the first neighbor of the current configuration and sets it as the current neighbor.
3. MSU 122 accepts the current neighbor by updating the current configuration with the current neighbor and go back to step 2 if the current neighbor is better than the current configuration, otherwise go to step 4.
4. If the current configuration has unprocessed neighbors, MGU 120 generates the next neighbor for the current configuration and sets it as the current neighbor, go to step 3; otherwise print the current configuration and End.

Various other heuristics, such as Tabu Search (TS), Genetic Algorithm (GA), and the great deluge algorithm (GDA) can be applied. Hybrid algorithms such as greedy simulated annealing, genetic simulated annealing are also applicable.

Figure 2:
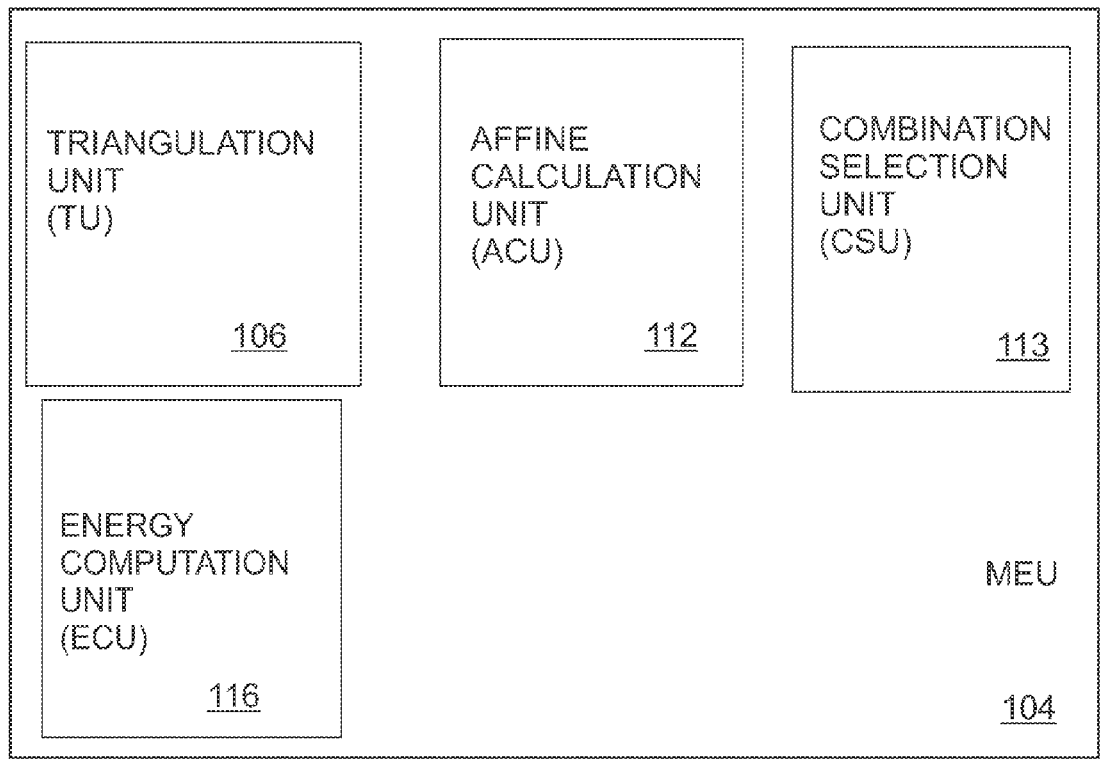
FIG. 2 is a block diagram of an illustrative embodiment of a matching evaluation unit shown in FIG. 1.

FIG. 2 is a block diagram of an exemplary embodiment of MEU 104 shown in FIG. 1. As shown in FIG. 2, MEU 104 includes a triangulation unit (TU) 106, an affine calculation unit (ACU) 112, a combination selection unit (CSU) 113, and an energy computation unit (ECU) 116. MEU 104 receives as input at least a sub-configuration comprising a first spatial point set (template point set), a second spatial point set (reference point set), and a one-to-one mapping between the two point sets. At output, it calculates one or more local or overall distance measures.

As illustrated in FIG. 1, MEU 104 may be configured to work with OU 102 so that mappings are generated by OU 102. For a given configuration or sub-configuration, MEU 104 computes one or more overall or local distance measures.

MEU 104 can be used as a post-processing unit for evaluating mappings generated by algorithms that match point sets. Doing so, MEU 104 may generate physical outputs, for example an energy score display in a console at the discretion of a human operator or a printed document.

MEU 104 can also be configured to work together with OU 102 to select a good mapping among a set of candidate mappings. MEU 104 can be configured to work with an energy function computation unit (EFCU) 105 so that the local or overall distance measures computed by MEU 104 are integrated into local or overall energy scores computed by EFCU 105. In these scenarios, MEU 104 generates software outputs that serve as inputs to other software applications, programs, or modules, the output can be passed among modules and processes using various methods such as function calls, sockets, files, calling protocols such as SOAP and DCOM, and combinations thereof.

In combination, MEU 104 and EFCU 105 together may either be configured to work together with OU 102 to select a good mapping among a set of candidate mappings, or be used as a post-processing unit for evaluating mappings generated by algorithms that match point sets.

In nD, an (n+1)-combination of a point set is a subset of the point set containing n+1 distinct points in general position. An (n+1)-combination can define a simplex in nD. For example, in 2D, three non-collinear points define a triangle, and in 3D, four non-coplanar points define a tetrahedron. If two (n+1)-combinations have n points in common and the interiors of the two corresponding simplices do not overlap, then we say that they are neighbors. Obviously a pair of neighbor (n+1)-combinations contains exactly n+2 unique vertices altogether. A point of a pair of neighbor (n+1)-combinations can refer to any member point of either (n+1)-combination. The intersection of a pair of (n+1)-combinations refers to the set of points belonging to both (n+1)-combinations. In 2D, two 3-combinations having 2 points in common means the corresponding triangles share a common edge, which we will refer to as the common edge of the two 3-combinations. Similarly, in 3D, two 4-combinations having 3 points in common means the corresponding tetrahedra share a common triangle, which we will refer to as the common triangle of the two 4-combinations. A mapped (n+1)-combination is an (n+1)-combination that contains n+1 non-isolated points. The correspondent of a mapped (n+1)-combination is defined to be the set of points consisting of the correspondents of all members of the (n+1)-combination.

We will use "common line" to refer to the line passing through a common edge (of a pair of 3-combinations) in 2D, and "common surface" to refer to the surface passing through a common triangle (of a pair of 4-combinations)) in 3D. Moreover, depending on the context "common hyperplane" refers to either a common edge or a common triangle.

We say that two (n+1)-combinations are agreeable if their intersection is not empty. The size of the intersection of two agreeable (n+1)-combinations (that is, the number of points belonging to both (n+1)-combinations) is defined as the agreeableness of the two (n+1)-combinations. Obviously, a pair of (n+1)-combinations are neighbors if and only if their agreeableness is n. We say that two (n+1)-combinations are k-agreeable, n≥k≥1, if and only if they are agreeable and the agreeableness is k. Furthermore, we say that two (n+1)-combinations are k+-agreeable if and only if their agreeableness is at least k.

We call the affine hull of the intersection of two agreeable (n+1)-combinations the agreeing space of the two agreeable (n+1)-combinations. If the agreeing space is a line, we sometimes call it an agreeing line, similarly we sometimes call an agreeing space an agreeing plane if the agreeing space is a plane. Thus the common line of two neighbor 3-combinations in 2D is the same as their agreeing line, and the common surface of two agreeable 4-combinations in 3D is the same as their agreeing plane. On the other hand, the line passing through the common points of two 2-agreeable 4-combinations is also called their agreeing line. Since the members of an (n+1)-combination are in general position, the agreeing space of two k-agreeable (n+1)-combinations must have dimension k−1.

In this embodiment, (n+1)-combinations are provided by triangulating the template point set. In block 106, TU 106 triangulates the template point set to obtain a triangulation, which we will call a template triangulation. In 2D, a template triangulation defines a set of triangles, which we call template triangles. In 3D it defines a set of tetrahedra, which we call template tetrahedra. In general, a triangulation of a point set in nD divides the convex hull of the points into nD simplices. For example, a triangulation of a point set in 2D divides the convex hull of the points into triangles; a triangulation in 3D divides the convex hull of the points into tetrahedra.

We say that a template triangle (resp: tetrahedron) is a mapped triangle (resp: tetrahedron) if all of its vertices have correspondents, which is equivalent to say that the 3-combination (resp: 4-combination) is mapped.

I contemplate that in this embodiment Delaunay triangulation is used, which in MATLAB® is provided by the function "delaunay". (MATLAB is a premier technical computing environment that is developed by MathWorks Inc., Natick, Mass., United States.) Delaunay triangulations are optimal in the sense of the MaxMin angle criterion, and they tend to avoid skinny triangles. There are various algorithms for computing Delaunay triangulations, e.g., the radial sweep algorithm, the incremental algorithm, and the divide-and-conquer algorithm. There are other triangulation methods based on various optimal criteria. For example, in minimum weight triangulation, the criterion is to minimize total edge weights. There are various software packages that implement triangulation for different programming languages: in MATLAB® 2D Delaunay triangulations are generated by the function "delaunay" and the function "delaunayn" computes Delaunay triangulations for a set of points in higher dimensions, alternatively is the function "DelaunayTri" that provides better control and modification capacity, the software package "Triangle" by Prof. Jonathan Richard Shewchuk at UC Berkley, and the Computational Geometry Algorithms Library (CGAL).

In this document, in 2D, a 3-combination, for example a 3-combination containing the vertices of a triangle, is often denoted by a tuple. For example, a 3-combination denoted by $(i_1, i_2, i_3)$ contains three distinct points $i_1, i_2, i_3$. Similarly, in 3D a tuple containing four points denotes a 4-combination, which for example could contain the vertices of a tetrahedron. A line segment is often denoted by a pair of end points. For example, $(p_1, p_2)$ represents a line segment whose two end points are $p_1$ and $p_2$.

In block 113, CSU 113 generates one or more sets of (n+1)-combinations in $V_1$, where each set consists of two agreeable (n+1)-combinations.

If more than one set of (n+1)-combinations are generated, an (n+1)-combination can appear in multiple sets. In this embodiment, I contemplate that in 2D each set consists of a pair of neighbor mapped 3-combinations, where each 3-combination contains the vertices of a template triangle, and the two template triangles share a common edge. In 3D each set consists of a pair of neighbor mapped 4-combinations, where each 4-combination contains the vertices of a template tetrahedron, and the two template tetrahedra share a common triangle. Whenever a pair of neighbor (n+1)-combinations satisfy the above condition, i.e., each of the (n+1)-combination contains the vertices of a template simplex, and the two simplices share a common (n−1)D simplex, then we say that the pair of neighbor (n+1)-combinations is induced by the template triangulation. To find all pairs of neighbor mapped 3-combinations in a template triangulation, we iterate through all internal edges of the template triangulation, and check for each internal edge whether both template triangles containing the edge are mapped. If the answer is yes, then CSU 113 generates a pair of neighbor mapped 3-combinations. A similar process applies in 3D.

For illustration purpose, for a configuration and its template triangulation, a dynamic triangulation can be created by the following procedure: if two points in the template point set are connected by an edge of the template triangulation (need to be differentiated from cross-edges, which are between different point sets), and none of the two points is isolated, then we add a new edge between their correspondents in the reference point set. We call this process of deriving a graph for a second point set from a graph of a first point set based on a one-to-one mapping between the two point sets a dynamic triangulation. The word "dynamic triangulation" is also used to refer to the obtained graph. Dynamic triangulations are used for illustrative purpose only, they are not intended to be part of the invention.

Figure 5:
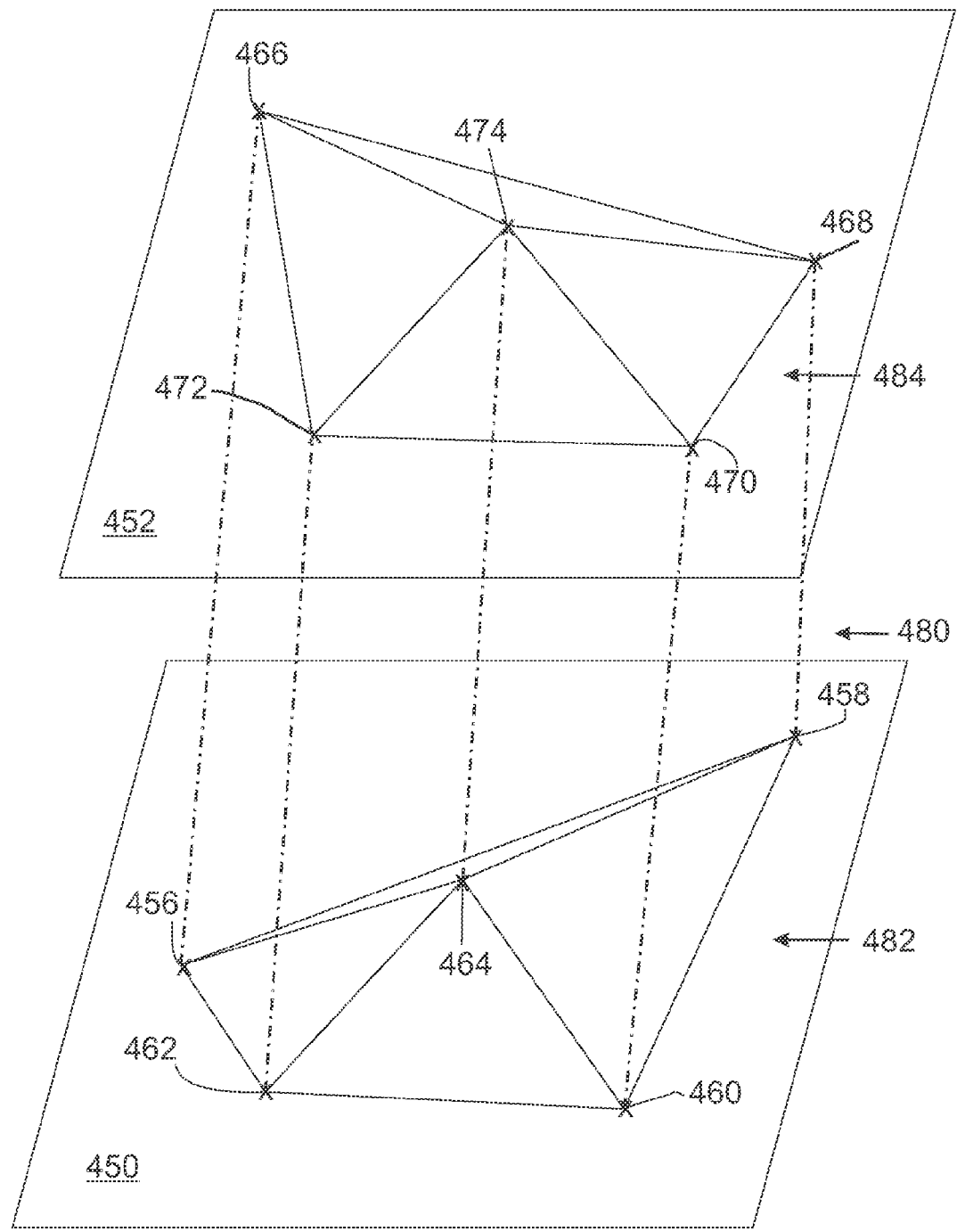
FIG. 5 is an exemplary illustration in 2D of a configuration, a template triangulation, and a dynamic triangulation.

For example, FIG. 5 illustrates a mapping 480 from a first point set 456, 458, 460, 462, 464 in a plane 450 respectively to a second point set 466, 468, 470, 472, 474 in a plane 452. After triangulating the first point set to obtain the triangulation 482, a dynamic triangulation 484 is created for the second point set. The 3-combinations (456, 462, 464) and (462, 460, 464) are 2-agreeable; the 3-combinations (456, 462, 464) and (458, 460, 464) are 1-agreeable.

Figure 6:
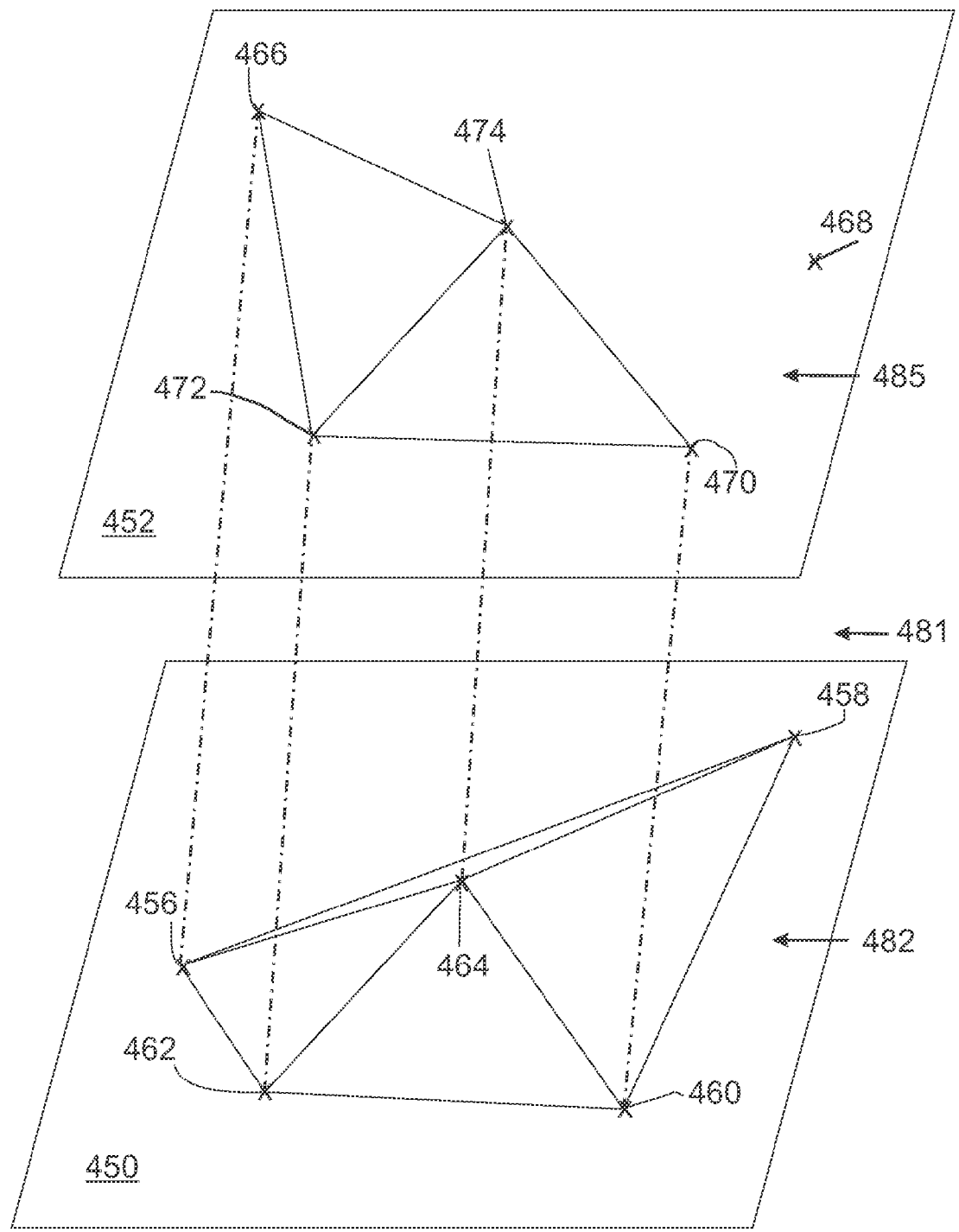
FIG. 6 is another exemplary illustration in 2D of a configuration, a template triangulation, and a dynamic triangulation.

FIG. 6 illustrates another mapping 481 from the points 456, 460, 462, 464 respectively to the points 466, 470, 472, 474. For the same triangulation 482, a dynamic triangulation 485 is created for the second point set, the dynamic triangulation does not involve point 468 and any edge adjacent to it because point 468 is not involved in mapping 481. In general a dynamic triangulation can contain multiple components that are not connected, and each disconnected component can have zero or more triangles, zero or more stand-alone edges, where an edge is stand-alone if it is not a part of any triangle, or a combination of both. Similarly, in 3D, a dynamic triangulation can contain multiple disconnected components, where each component can have zero or more tetrahedra, zero or more stand-alone triangles (i.e., not part of any tetrahedron), and zero or more stand-alone edges (i.e., not part of any triangle).

There are various ways to generate pairs of agreeable (n+1)-combinations based on a template triangulation. One embodiment iterates through vertices of the template triangulation to obtain pairs of 1+-agreeable (n+1)-combinations. Another embodiment iterates through internal edges of the template triangulation to obtain pairs of 2+-agreeable (n+1)-combinations. Yet another embodiment in 3D iterates through triangles of the template triangulation to obtain pairs of 3+-agreeable (n+1)-combinations. Moreover, to find for a pair of p+-agreeable (n+1)-combinations whether the two (n+1)-combinations are q+-agreeable or q-agreeable, q≥p, one can look into the size of the intersection of the two (n+1) combinations.

For example, in one embodiment in 2D, each set consists of a pair of 1+-agreeable 3-combinations, that is, for each pair, its two member (n+1)-combinations share 1 or more points in common. According to this criteria, as an illustrative example in FIG. 5, the two 3-combinations (462, 464, 460) and (456, 458, 464) can be paired up because they share a common point 464, the two 3-combinations (456, 462, 464) and (462, 460, 464) can also be paired up because they share two common points 462 and 464. One way to generate all pairs of 1+-agreeable 3-combinations is to iterate through all points in $V_1$. For each point all triangles containing it as a vertex are obtained and then paired up in all possible ways as long as an (n+1)-combination is not paired up with itself. Then if a point has m distinct triangles containing it as a vertex, there are $\binom{m}{2}$ such pairs. This way a pair of neighbor 3-combinations will be counted twice, once for each end point of the common edge. Duplicated pairs are then removed.

Similarly, in 3D, a pair of 1+-agreeable 4-combinations can be two tetrahedra sharing a common vertex, a common edge, or a common triangle.

Alternatively, instead of generating pairs of agreeable (n+1)-combinations based on a template triangulation, there are various ways to generate pairs of agreeable (n+1)-combinations without a template triangulation, that is, a template triangulation is not used and TU 106 can be omitted from MEU 104.

Figures 14A, 14B:
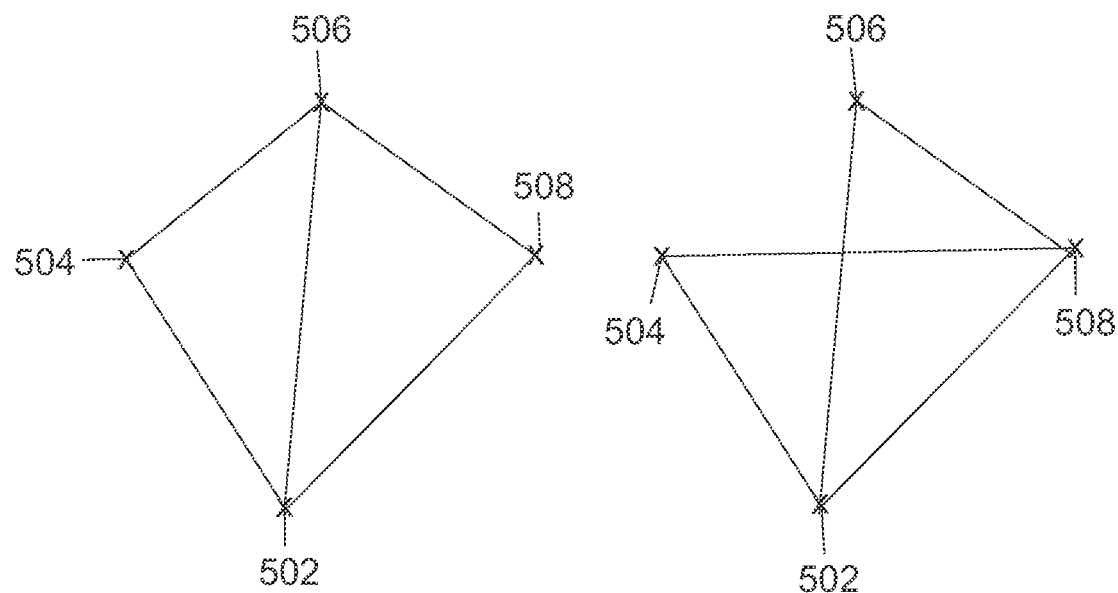
FIGS. 14A-14B are exemplary illustrations of an example and a counter example according to one embodiment of generating pairs of 2-agreeable (n+1)-combinations without using a template triangulation in 2D.

In one embodiment in 2D, four points are chosen randomly from $V_1$ such that all points are the vertices of their convex hull. Consequently none of the points is in the triangle having the other three points as its vertices. This can be achieved by randomly selecting three points from $V_1$ such that the points are not colinear, then repetitively choose randomly a point from the remaining points of $V_1$ and test whether the point is in the triangle having the first three points as its vertices until a point from the outside of the triangle is found. Then from the four points a pair of neighbor mapped (n+1)-combinations can be obtained by either triangulating the four points, or constructing a second triangle from a first one by adding two edges between the fourth point and two of the first three points such that no edges crosses each other or overlaps with each other at more than one point. Referring to FIGS. 14A-14B, in FIG. 14A there is one exemplary illustrations of the procedure just described, where three points 502, 506 and 508 are first selected, then a fourth point 504 is chosen. For this alternative embodiment, the two 3-combinations are (504, 502, 506) and (502, 506, 508). On the other hand, for this alternative embodiment, the two 3-combinations can not be (504, 502, 508) and (506, 502, 508) because edge (504, 508) will cross edge (502, 506). A similar embodiment applies to 3D, where after three non-collinear points are randomly chosen, a fourth point is chosen from the remainings of $V_1$ such that it is not in the plane of the first three points, and a fifth point is chosen from the remainings of $V_1$ after removing the first three points and the fourth point, such that it is not in the plane of the first three points and it is to the other side of the plane. In both embodiments the two (n+1)-combinations are separated by a hyperplane.

Figures 15A, 15B:
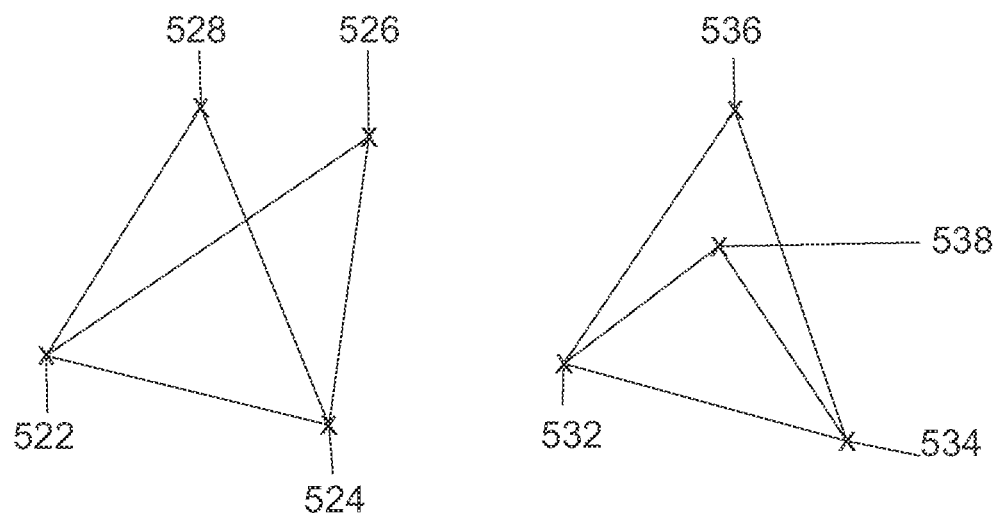
FIGS. 15A-15B are two exemplary illustrations according to another embodiment of generating pairs of 2-agreeable (n+1)-combinations without using a template triangulation in 2D.

Another embodiment in 3D involves first choosing three points randomly from $V_1$ such that they are non-collinear. Next two distinct points, that is, a fourth point and a fifth point, are chosen from the remaining s of $V_1$ such that neither are in the plane containing the first three points. A pair of neighbor (n+1)-combinations are generated such that the first one contains the first three points and the fourth point, and the second one contains the first three points and the fifth point. In a similar embodiment in 2D, first two points are randomly chosen from $V_1$ such that they do not overlap, next two distinct points, that is, a third point and a fourth point, are chosen from the remainings of $V_1$ such that neither are in the line containing the first two points. A pair of neighbor (n+1)-combinations are generated such that the first one contains the first two points and the third point, and the second one contains the first two points and the fourth point. In both embodiments one point may be contained in the convex hull of the other points. Referring to FIGS. 15A-15B, there are two exemplary illustrations of the procedure just described. In FIG. 15A, points 522 and 524 are first chosen, then two distinct points 528 and 526 are chosen. The pair of neighbor (n+1)-combinations are (522, 524, 526) and (522, 524, 528). In FIG. 15B, points 532 and 534 are first chosen, then two distinct points 536 and 538 are chosen. The pair of neighbor (n+1)-combinations are (532, 534, 536) and (532, 534, 538). Notice point 538 is in the triangle formed by points 532, 534, and 536.

Figure 16:
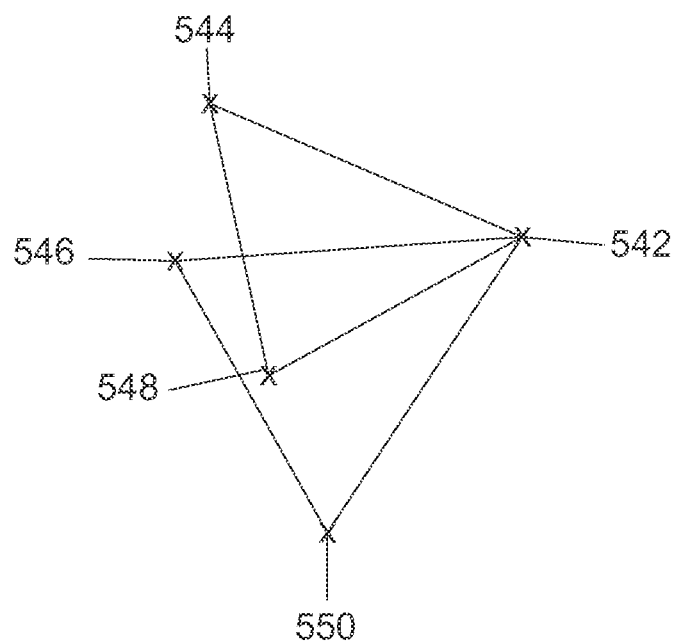
FIG. 16 is an exemplary illustration according to one embodiment of generating pairs of 1-agreeable (n+1)-combinations without using a template triangulation in 2D.

Another embodiment in 2D involves choosing five distinct points randomly from $V_1$ such that the first, the second, and third points are not collinear and the first, the fourth, and the fifth points are not collinear. The first (n+1)-combination consists of the first, the second, and the third points, and the second (n+1)-combination consists of the first, the fourth, and the fifth points. The two (n+1)-combinations share the first point in common. Referring to FIG. 16, there is shown an exemplary illustration of the procedure just described. Five points 542, 544, 548, 546, 550 are chosen in that order. The first (n+1)-combination contains points 542, 544, and 548. The second one contains points 542, 546, and 550. The two share a common point 542. A similar embodiment in 3D involves choosing seven distinct points randomly from $V_1$ such that the first, the second, the third, and the fourth points are not coplanar and the first, the fifth, the sixth, and the seventh points are not coplanar. The first (n+1)-combination consists of the first, the second, the third, and the fourth points, and the second (n+1)-combination consists of the first, the fifth, the sixth, and the seventh points. The two (n+1)-combinations share the first point in common.

In the above embodiments, if only non-isolated points are allowed (for example by either sampling directly from the set of non-isolated points, or sampling from both isolated and non-isolated template points and reject isolated points), then the resulting (n+1)-combinations are mapped.

Figure 7:
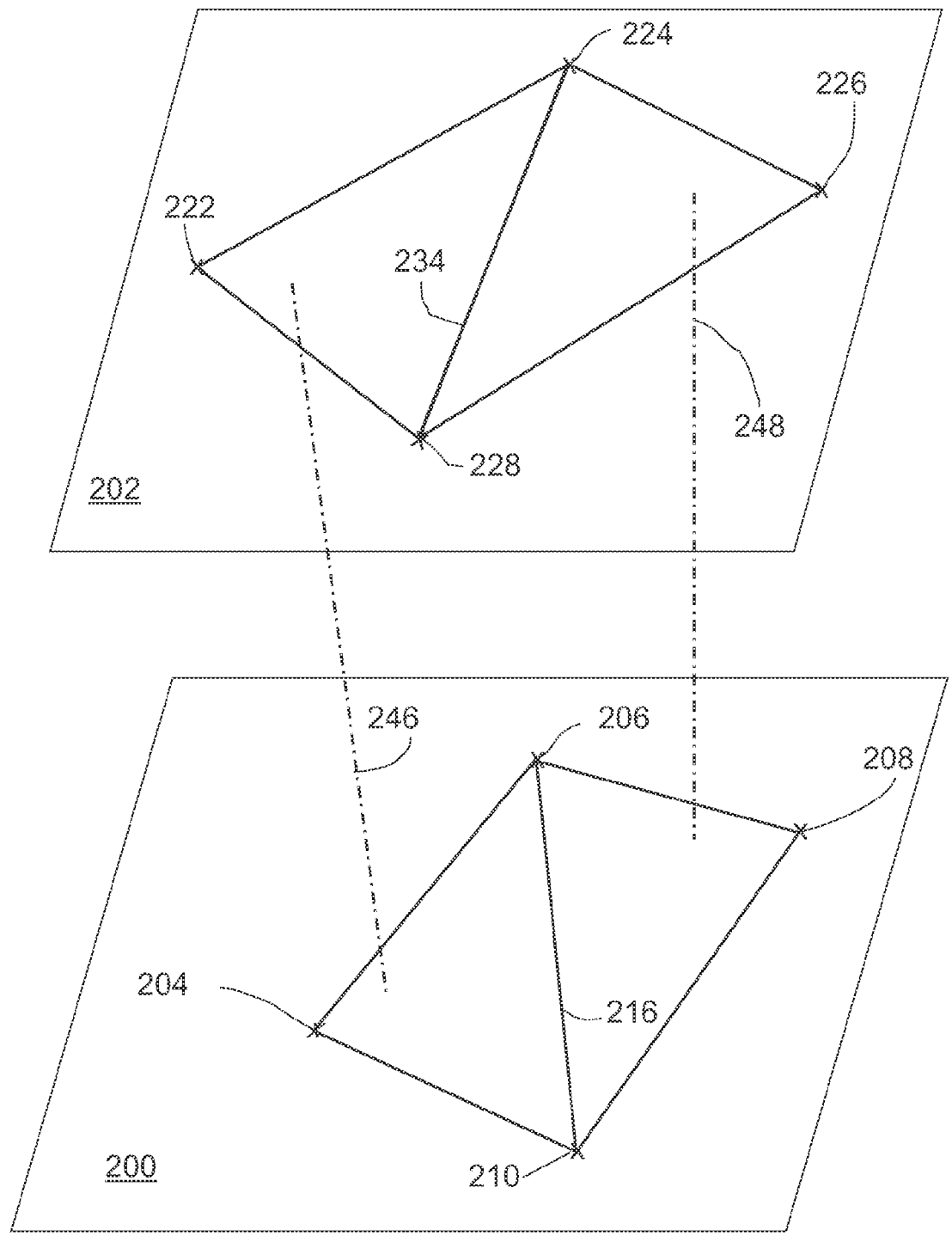
FIG. 7 is an exemplary illustration in 2D of two affine transformations generated from two neighbor 3-combinations.

In block 112, ACU 112 receives at least a mapped (n+1)-combination in $V_1$ and computes for it an affine transformation. Since the points are in general position, an affine transformation is defined. The affine transformation is said to be generated from the mapped (n+1)-combination, and the (n+1)-combination is said to be associated with the affine transformation. Referring to FIG. 7, there is shown an exemplary illustration of two affine transformations 246 and 248 in 2D. The affine transformation 246 is defined by the mapping from points 204, 206, 210 in a plane 200 respectively to points 222, 224, 228 in a plane 202 (equivalently it maps a triangle/3-combination (204, 206, 210) to a triangle/3-combination (222, 224, 228), plane 200 and plane 202 could be interpreted as either the same plane or different planes, depending on the application context). On the other hand, affine transformation 248 maps points 206, 208, 210 respectively to points 224, 226, 228.

Figure 8:
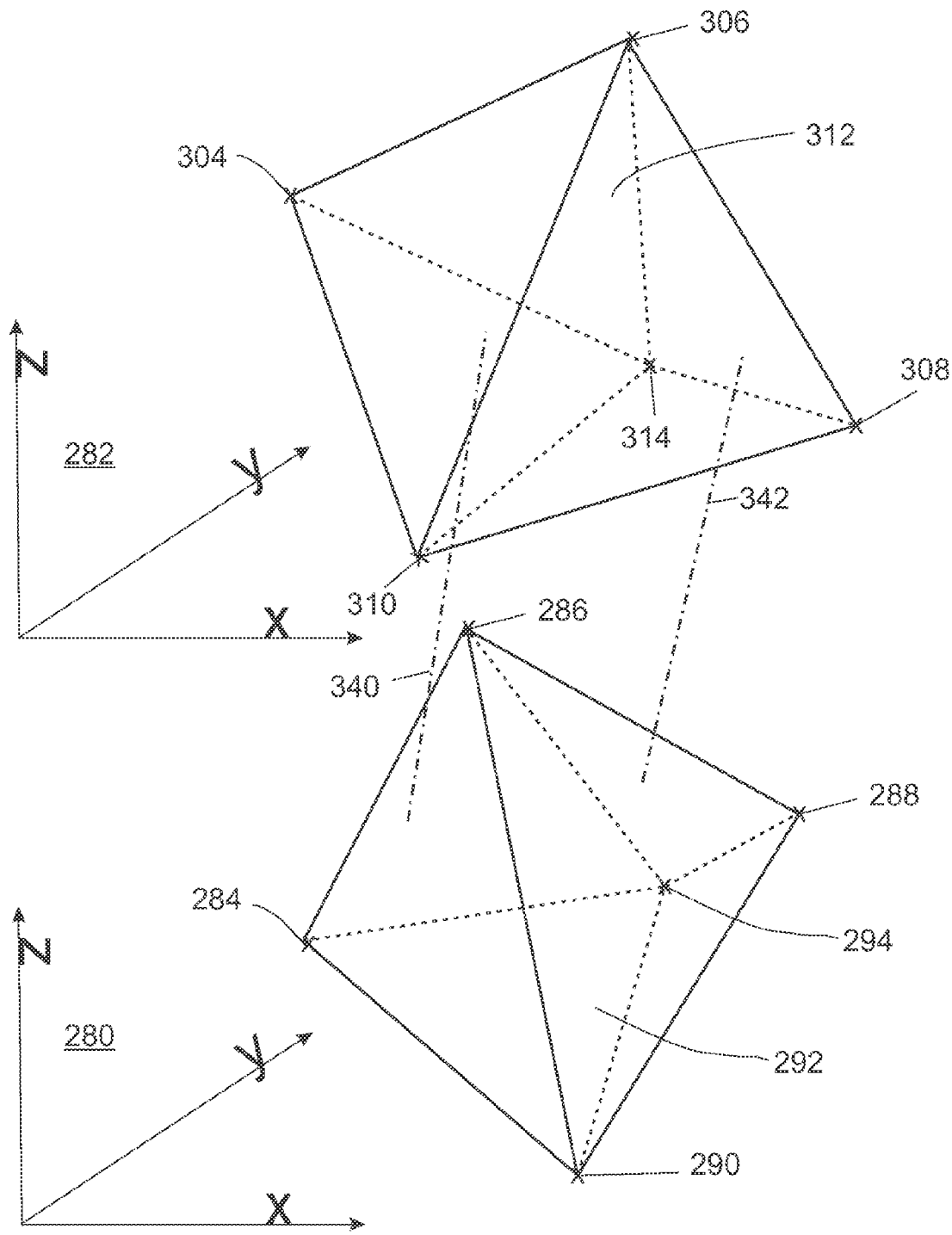
FIG. 8 is an exemplary illustration in 3D of two affine transformations generated from two neighbor 4-combinations.

The same holds in 3D. Whenever there is a mapped 4-combination, an affine transformation is defined. Referring to FIG. 8, there is shown an exemplary illustration of two affine transformations 340 and 342 in 3D. The affine transformation 340 is defined by the mapping between points 284, 286, 294, 290 in a space 280 and respectively the points 304, 306, 314, 310 in a space 282 (equivalently it maps tetrahedron/4-combination (284, 286, 294, 290) to tetrahedron/4-combination (304, 306, 314, 310)). The space 280 and the space 282 could either be the same space or different spaces (similar comments will be omitted hereafter). The affine transformation 342 maps points 286, 288, 290, 294 respectively to points 306, 308, 310, 314. The affine transformations agree on a triangle 292 (and the 3-combination (286, 294, 290)), which both affine transformations transform to a triangle 312. The surface passing through triangle 292 is also the agreeing space of the two 3-agreeable 4-combinations (284, 286, 294, 290) and (286, 288, 290, 294).

In this embodiment, I contemplate that in 2D affine transformations are computed by the following equation:

$$A = I + [u_1, u_2, u_3][\text{loc}(x_1), \text{loc}(x_2), \text{loc}(x_3)]^{-1} \quad (1)$$

Here A is a 3-by-3 affine transformation matrix to be computed, $x_1, x_2, x_3$ are members of a mapped 3-combination, $y_1, y_2, y_3$ are their respective correspondents, $u_i = \text{loc}(y_i) - \text{loc}(x_i)$, i=1, 2, 3 are the displacement vectors, and all coordinates are in homogeneous coordinates. As long as the three points $x_1, x_2, x_3$ are not collinear, we will obtain a full-ranked affine matrix A. The matrix A could represent the local affine motion within a triangle. One may easily extend Equation 1 to work in 3D. Alternatively there are various ways to solve for affine transformations: if the spatial dimension is small (like in 2D or 3D), then existing formulas for matrix inversion can be used, where such formulas can be obtained by using matrix determinants and matrix cofactors; otherwise, methods such as Gauss-Jordan elimination, Gaussian elimination, or LU decomposition can be used to either invert [$\text{loc}(x_1), \text{loc}(x_2), \text{loc}(x_3)$] or compute A directly by solving the linear system:

$$A[\text{loc}(x_1), \text{loc}(x_2), \text{loc}(x_3)] = [\text{loc}(x_1), \text{loc}(x_2), \text{loc}(x_3)] + [u_1, u_2, u_3]$$

Also, there are various ways to compute the inverse of a matrix. For example, in MATLAB®, the matrix inversion in equation 1 can be accomplished either by function "inv( )" or by using the "/" operator. In C++ matrix inversion can be accomplished by, for example, functions in "boost/numeric/ublas/lu.hpp". Alternatively, function "gsl_linalg_LU_invert" from the GNU Science Library can also be used to invert a matrix.

Alternatively, an affine transformation from $x_1, x_2, x_3$ to $y_1, y_2, y_3$ can be obtained by first computing an affine transformation that maps $y_1, y_2, y_3$ to $x_1, x_2, x_3$, then inverting the transformation matrix.

Alternatively, in one embodiment, the Direct Linear Transformation (DLT) algorithm in the book 'Multiple View Geometry in Computer Vision' by Hartley and Zisserman (2003, Cambridge University Press, 2nd edition, Chapter 4) is employed. Notice that while four template points and four corresponding reference points (in general position) are necessary to compute a projective transformation in 2D, only three template points and three corresponding reference points (in general position) are needed for an affine transformation.

Alternatively, in nD it is possible to generate an affine transformations from more than (n+1) non-isolated template points by solving an over determined system using pseudo inverse. Most embodiments in this invention can be adapted to work with this alternatives with minor modifications. We will not discuss further in this direction.

We say that n, n≥2 affine transformations $T_1, T_2, \ldots, T_n$ agree on a point $\vec{p}$ if and only if they transform the point to the same point: $T_1(\vec{p}) = T_2(\vec{p}) = \ldots = T_n(\vec{p})$, and they agree on a set if and only if they agree on each point of the set.

For two affine transformations $T_1, T_2$, we call the collection of all points $\vec{p}$ such that $T_1(\vec{p}) = T_2(\vec{p})$ their agreeing space. First of all, we want to prove some properties about the agreeing space of two affine transformations.

Theorem 0.1 Let $H_T$ be the agreeing space of two affine transformations $T_1$ and $T_2$, then $H_T$ is an affine space.

Proof Suppose that $H_T$ is not empty, and let $\vec{p}$ and $\vec{q}$ be any two points in $H_T$, $\therefore T_1(\vec{p}) = T_2(\vec{p})$, $T_1(\vec{q}) = T_2(\vec{q})$. For $\lambda \in R$, since $$T_1(\lambda \vec{p} + (1-\lambda)\vec{q}) = A(T_1)(\lambda \vec{p} + (1-\lambda)\vec{q}) + \vec{t}(T_1)$$

$$= \lambda(A(T_1)(\vec{p}) + \vec{t}(T_1)) + (1-\lambda)(A(T_1)(\vec{q}) + \vec{t}(T_1))$$

$$= \lambda T_1(\vec{p}) + (1-\lambda)T_1(\vec{q})$$

$$= \lambda T_2(\vec{p}) + (1-\lambda)T_2(\vec{q})$$

$$= T_2(\lambda \vec{p} + (1-\lambda)\vec{q})$$

the result follows.

Lemma 0.2 Let $H_T$ be the non-empty agreeing space of two affine transformations $T_1$ and $T_2$, and $\vec{p}$ be any point in $H_T$, then $H_T - \vec{p}$ is the null space of $A(T_1) - A(T_2) = A(T_1 - T_2)$.

Proof $\forall \vec{v} \in H_T - \vec{p}$, $T_1(\vec{p} + \vec{v}) = T_2(\vec{p} + \vec{v})$, therefore $(A(T_1) - A(T_2))(\vec{p}) + (A(T_1) - A(T_2))(\vec{v}) + \vec{t}(T_1) - \vec{t}(T_2) = 0$. Since $T_1(\vec{p}) = T_2(\vec{p})$, $A(T_1)(\vec{p}) - A(T_2)(\vec{p}) = \vec{t}(T_2) - \vec{t}(T_1)$. The reverse direction can be proved by reversing the derivations.

From the way affine transformations are generated, it is obvious that two affine transformations generated from two neighbor mapped (n+1) combinations agree on the intersection, the common hyperplane, and the affine hull of the intersection of the two (n+1)-combinations. In FIG. 7, the affine transformations 246 and 248 agree on a line segment 216, which both affine transformations transform to a line segment 234. In FIG. 5, the affine transformation that transforms points 456, 458, 464 to points 466, 468, 474 and the affine transformation that maps points 456, 464, 462 to points 466, 474, 472 agree on the line segment (456, 464) by construction. In general, it is obvious that:

Theorem 0.3 Two affine transformations generated from two agreeable mapped (n+1)-combinations agree on the agreeing space of the two (n+1)-combinations.

This said, it is well known by those skilled in numerical computation that because all digital computers have finite precision, in computation there might be a small numerical error that causes $T_1(\vec{p})$ to be slightly different from $T_2(\vec{p})$ even though $\vec{p}$ belongs to the agreeing space of the two (n+1)-combinations that generate $T_1$ and $T_2$. We intend to tolerate such numerical errors when we are doing numerical computation. This applies to all numerical computations using digital computers.

Figure 4:
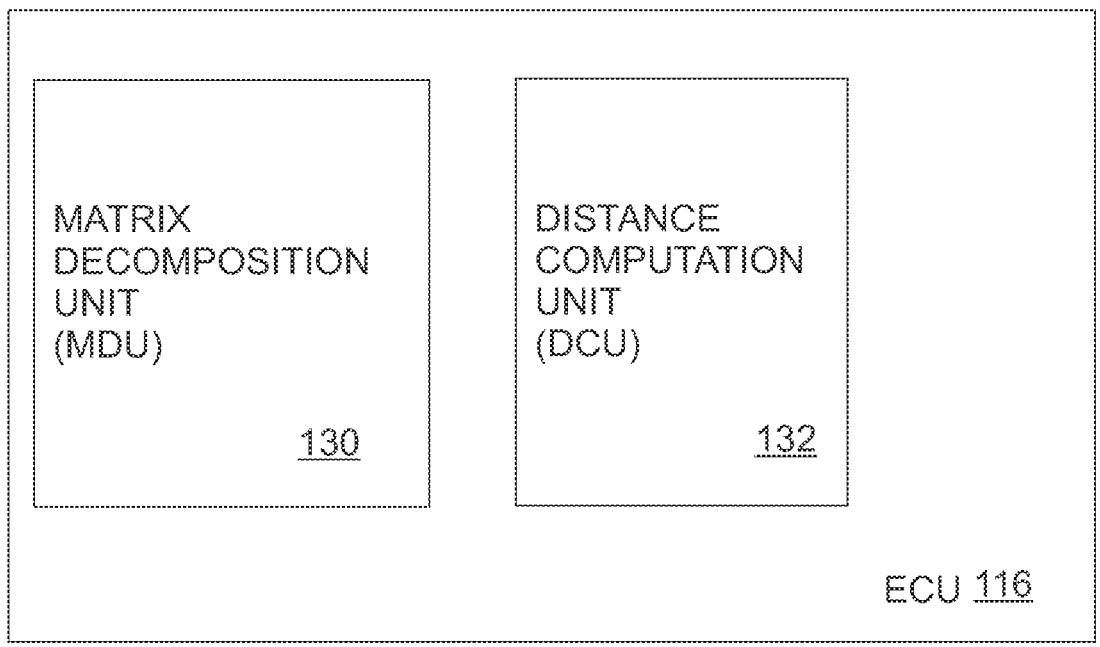
FIG. 4 is a block diagram of an illustrative embodiment of an energy computation unit shown in FIG. 2.

Referring to FIG. 4, ECU 116 contains a matrix decomposition unit (MDU) 130 and a distance computation unit (DCU) 132. In block 116, ECU 116 receives at least a pair of affine transformations $T_1$, $T_2$ generated from a pair of agreeable mapped (n+1)-combinations. In the current embodiment, MDU 130 computes q, $1 \leq q \leq n$ largest singular values of $X = A(T_1) - A(T_2)$ or equivalently $X = A(T_1 - T_2)$. And DCU 132 generates a local distance measure based on the at least k largest singular values of the q largest singular values, where $1 \leq k \leq q$. ECU 116 may further compute one or more local or overall distance measures based on multiple local distance measures.

This procedure is motivated by the following theorem:
Theorem 0.4 Let $H_T$ be the non-empty agreeing space of two affine transformations $T_1$ and $T_2$ in nD, $\{w_1, w_2, \ldots, w_s\}$, $s \leq n$ be a basis of $H_T - \vec{p}$, $w_{s+1}, \ldots, w_n$ be arbitrary vectors in $R^n$, and $\vec{p}$ be any point in $H_T$, then $$\max_{\vec{v} \in R^n, \vec{v} \perp \{w_1, w_2, \ldots, w_s\}, \|\vec{v}\|=1} \|T_1(\vec{p} + \vec{v}) - T_2(\vec{p} + \vec{v})\| = \sigma_1$$

where $\sigma_1$ is the largest singular value of $A(T_1) - A(T_2)$. Moreover, $A(T_1) - A(T_2)$ has n−s non zero singular values denoted by $\sigma_l$, $1 \leq l \leq n-s$, $\sigma_1 \geq \ldots \geq \sigma_{n-s}$, $$\min_{w_{s+1}, \ldots, w_{s+l-1} \vec{v} \in R^n, \vec{v} \perp \{w_1, w_2, \ldots, w_s, w_{s+1}, \ldots, w_{s+l-1}\}, \|\vec{v}\|=1} \|T_1(\vec{p} + \vec{v}) - T_2(\vec{p} + \vec{v})\| = \sigma_l,$$

$$2 \leq l \leq n-s$$

Proof From Lemma 0.2 and 7.3.10 in "Matrix Analysis" by Horn and Johnson (Cambridge Cambridgeshire; New York, Cambridge University Press. 1985).

In block 130, in this embodiment, MDU 130 receives at least a pair of affine transformations $T_1$, $T_2$ generated from a pair of agreeable mapped (n+1)-combinations, and uses singular value decomposition (SVD) to obtain q, $1 \leq q \leq n$ largest singular values of $X = A(T_1) - A(T_2)$ or equivalently $X = A(T_1 - T_2)$. The singular values of a matrix A are the non-negative square roots of the eigenvalues of $AA^*$, where $A^*$ is the conjugate transpose of A.

There are various ways to compute the singular values of a matrix. In this embodiment, I contemplate that in block 130, function "svd(X)" in MATLAB® is used to compute all singular values of X. At this time the MATLAB function "svd(X)" computes the six largest singular values, which in 2D or 3D is more than enough. Alternatively, in one embodiment, instead of returning all singular values all at once, function "svds(X,q)" returns the q largest singular values of X. Alternatively, there are various libraries that implements SVD for various programming languages. For example, in C++, the Linear Algebra Package (LAPACK) provides subroutines, for example "dgesvd_", to compute SVD for a double precision matrix, the GNU Scientific Library provides functionalities such as "gsl_linalg_SV_decomp", "gsl_linalg_SV_decomp_mod", and "gsl_linalg_SV_decomp_jacobi" for computing singular values using various algorithms. In Python, the NumPy module and the SciPy module both provide "svd" functions.

Alternatively, singular values of a matrix A can be obtained by computing the eigenvalues of $AA^*$ or $A^*A$ followed by taking their square roots. In MATLAB® function "eig" computes eigenvalues. Most libraries named above provide functionalities for computing eigen values, for example "eig" in NumPy and SciPy, and some functions in "gsl_eigen.h".

Alternatively, for small matrices, their singular values may be computed analytically. For example, for a 2-by-2 matrix, its singular values can be computed analytically (Singular value decomposition. In Wikipedia. Retrieved Aug. 5, 2012, from http://www.gnu.org/software/gsl/manual/html_node/Singular-Value-Decomposition.html).

Alternatively, various reduced SVDs can be used. For example, thin SVD, compact SVD, and truncated SVD are variations of the standard SVD that can also be used (Singular value decomposition. In Wikipedia. Retrieved Aug. 5, 2012, from http://www.gnu.org/software/gsl/manual/html_node/Singular-Value-Decomposition.html).

Alternatively, one can implement procedures for computing SVD. Instructions and references for implementing various SVD algorithms can be found in many sources, including but not limited to, for example, "Matrix Computations" by Gene H. Golub and Charles F. Van Loan (Johns Hopkins University Press, Baltimore, Md., USA. 1996).

Next, in block 132, for each pair of affine transformations $T_1$, $T_2$ that ECU 116 receives, DCU 132 computes a local distance measure based on $X=A(T_1)-A(T_2)$, the difference of the left sub-matrices of the pair of affine transformations.

Because the singular values of $A(T_1)-A(T_2)$ are usually not equal to those of $T_1-T_2$, the local distance measures computed according to some procedures described here based on $A(T_1)-A(T_2)$ are usually different from those on $T_1-T_2$.

In general, computing a local distance measure based on the difference of the left sub-matrices of a pair of affine transformations involves
 computing a matrix norm of $A(T_1)-A(T_2)$ using some of its largest singular values, and equivalents; or
 computing the product of some largest singular values of $A(T_1)-A(T_2)$, and equivalents.

In this embodiment, I contemplate that the local distance measure is the Ky Fan p-k norm for $A(T_1)-A(T_2)$, $1 \le k \le q$, using the k largest of the q largest singular values of $A(T_1)-A(T_2)$ computed by MDU 130, where p, k are user specified parameters. Recall that in general for an m-by-n matrix T the Ky Fan p-k norm is defined as $$N_{k,p}(T)=(\sigma_1(T)^p+\ldots+\sigma_k(T)^p)^{1/p} \quad (2)$$

for $p \ge 1$ and $k=1,\ldots,\min\{m,n\}$. $\sigma_1 \ge \sigma_2 \ge \ldots \ge \sigma_{min(m,n)}$ are the singular values of T. When $k=\min(m,n)$, the above function is also called the Schatten p-norm.

In this embodiment, in MATLAB®, the exemplary code below illustrates the steps carried out by MDU 130 and DCU 132:

```
function [result]=AgreeingSpaceDistance (T1, T2, n, p, k)
% T1 and T2 are agreeable (n+1)-by-(n+1) affine transformations in nD.
% computes Ky Fan p-k norm.
% Step 1: Compute difference of left submatrices
DifferenceOfLeftSubMatrix=T1(1:n, 1:n)-T2(1:n, 1:n);
% Step 2: Compute Singular values
SingularValues=svd(DifferenceOfLeftSubMatrix);
% Step 3: Compute Ky Fan p-k-norm
result=(sum(SingularValues(1:k).^p)).^(1.0/p);
```

Alternatively, in another embodiment that is based on the C/C++ programming language, the exemplary code below uses the Linear Algebra Package (LAPACK) to illustrate the steps carried out by an alternative embodiment of MDU 130 and DCU 132:

```
//SVD
extern void dgesvd_( char* jobu, char* jobvt, int* m, int* n, \
double* a, int* lda, double* s, double* u, \
int* ldu, double* vt, int* ldvt, \
                   double* work, int* lwork, int* info );
/*
*T1, T2: (n+1)-by-(n+1) agreeable affine matrices in column-major in nD.
*p,k: Ky Fan p-k-norm, p>=1, 1<=k<=n
*/
double AgreeingSpaceDistance(double* T1, double* T2, \
int n, int p, int k){
    double result=0.0;
    int i,j;
    //To hold the singular values
    double* S=malloc (sizeof(double) * n);
    double* U=malloc (sizeof(double) * n*n);
    double* VT=malloc (sizeof(double) * n*n);
    //A is the difference of the left submatrices
    double* A=malloc (sizeof(double) * n*n);
    for(i=0;i<=n-1;i++)
for(j=0;j<=n-1;j++)
    {
A[i*n+j]=T1[i*(n+1)+j]-T2[i*(n+1)+j];
}
    //prepare parameters for SVD
    int info, lwork=-1;
    double wkopt;
    double* work;
    //Query and Allocate workspace
    dgesvd_( "All", "All", &n, &n, A, &n, S, U, &n, \
VT, &n, &wkopt, &lwork, &info );
    lwork = (int)wkopt;
    work = (double*)malloc( lwork*sizeof(double) );
    //Compute SVD
    dgesvd_( "All", "All", &n, &n, A, &n, S, U, &n, \
VT, &n, work, &lwork, &info );
    //Compute Ky Fan k-p-norm
    for(i=0;i<k;i++){
result+=pow(S[i],p);
    }
    result=pow(result,1.0/p);
    //clean up
    free(A);
    free(U);
    free(VT);
    free(S);
    free(work);
    return result;
}
```

Alternatively, python is used in another embodiment of MDU 130 and DCU 132:

```
from numpy import *
def AgreeingSpaceDistance(T1,T2,n,p,k):
    #%Compute difference of left submatrices
    DifferenceOfLeftSubMatrix=T1[:n,:n]-T2[:n,:n];
    print DifferenceOfLeftSubMatrix
    #Compute Singular values
    SingularValues=
linalg.svd(DifferenceOfLeftSubMatrix,compute_uv=False)
    #print SingularValues[0]
    #Compute Ky Fan p-k-norm
    result=power(sum(power(SingularValues[0:k],p)),1.0/p)
    return result
```

Depending on the values of p and k, some of the Ky Fan p-k norms are equivalent to other matrix norms. For example, since the trace norm is equal to the sum of all singular values, in another embodiment MDU 130 is omitted, and DCU 132 receives at least a pair of affine transformations $T_1$, $T_2$ generated from a pair of agreeable mapped (n+1)-combinations, computes the difference of the left sub-matrices of $T_1$ and $T_2$: $X=A(T_1)-A(T_2)$ (or equivalently $X=A(T_1-T_2)$), and computes a local distance measure that is the trace norm of X. Recall that the trace norm of a matrix X is defined as:

$$\text{trace}(\sqrt{X^*X})$$

where $B=\sqrt{X^*X}$ is the unique positive semi-definite matrix such that $BB=X^*X$, B is often referred to as $X^*X$'s principal square root, which there are various ways to compute. In this embodiment in MATLAB®, the principal square root is computed by using the function "sqrtm". In C++, the Linear Algebra Package (LAPACK) provides a routine with the same name. In Python, Scipy provides a function "scipy.linalg.sqrtm" that returns the principal square root as an array.

Alternatively, if the spatial dimension is 2, then X is a 2-by-2 matrix, and its principal square root can be solved analytically (Square root of a 2 by 2 matrix. In Wikipedia. Retrieved Aug. 6, 2012, from http://en.wikipedia.org/wiki/Square_root_of_a_2_by_2_matrix). In 2D and higher dimensions, the principal square root can be computed by various methods such as diagonalization, DenmanBeavers iteration, and the Babylonian method (Square root of a matrix. In Wikipedia. Retrieved Aug. 8, 2012, from http://en.wikipedia.org/wiki/Square_root_of_a_matrix).

As a another example, if one lets p=2 and k=n in computing the Ky Fan p-k-norm of X, then it is well known that the result is equivalent to the Frobenius norm:

$$\|X\|_F = \sqrt{\sum_{i=1}^{n} \sum_{j=1}^{n} |X_{ij}|^2}$$

Thus in another embodiment MDU 130 is omitted, and DCU 132 receives at least a pair of affine transformations $T_1$, $T_2$ generated from a pair of agreeable mapped (n+1)-combinations, computes the difference of the left sub-matrices of $T_1$ and $T_2$: $X=A(T_1)-A(T_2)$ (or equivalently $X=A(T_1-T_2)$), and computes a local distance measure by computing the square root of the sum of the absolute squares of X's elements, or the square root of the trace of X*X. Alternatively, for example, in MATLAB®, function "norm(X,'fro')" computes the Frobenius norm of X.

Alternatively, in another embodiment computing the local distance measure involves computing (c,p)-norm of $X=A(T_1)-A(T_2)$. Recall that the (c,p)-norm for the n-by-n matrix X is defined for $k \in N$, $k \le n$, $c \in R^k$, $c_1 \ge c_2 \ge \ldots \ge c_k \ge 0$, $1 \le p \le \infty$:

$$\|X\|_{(c,p)}^k = \left( \sum_{i=1}^{k} c_i \sigma_i^p(X) \right)^{1/p}$$

where $\sigma_i$, $1 \le i \le k$ are the largest singular values of the q largest singular values of X computed by MDU 130. (see DEZA and DEZA 2009, page 224).

A similar result applies to the product of singular values, if one lets k=n, then the product of $\sigma_1, \ldots, \sigma_n$ is equivalent to the absolute value of the determinant:

$$|\det(X)|=\sigma_1 \ldots \sigma_n$$

Thus in another embodiment MDU 130 is omitted, and DCU 132 receives at least a pair of affine transformations $T_1$, $T_2$ generated from a pair of agreeable mapped (n+1)-combinations, computes the difference of the left sub-matrices of $T_1$ and $T_2$: $X=A(T_1)-A(T_2)$ (or equivalently $X=A(T_1-T_2)$), and computes a local distance measure that is the absolute value of the determinant of X.

I contemplate that in this embodiment, an overall distance measure is generated by computing the arithmetic mean of all local distance measures:

$$\frac{1}{N}\sum_{i=1}^{N} d(P_i) \quad (3)$$

where $d(P_i)$ is the local distance measure computed by ECU 116 for a pair of mapped agreeable (n+1)-combinations $P_i$ generated by CSU 113, and N is the total number of pairs generated by CSU 113. There are various ways to compute a local or overall distance measure from multiple local distance measures. In one embodiment, a local or overall distance measure is generated by computing the geometric mean of multiple local distance measures. In another embodiment, an overall distance measure is generated by computing a weighted average of multiple local distance measures. In yet another embodiment, a local or overall distance measure is set to be the maximum of multiple local distance measures.

Next, the local or overall distance measures may be integrated as energy terms into an energy score computed by EFCU 105, or used by themselves to indicate the quality of the configuration, for example to be displayed in an UI for the discretion of a human operator.

In block 105, EFCU 105 may receive one or more local or overall distance measures generated by ECU 116 and computes one or more local or overall energy scores according to an energy function. In this embodiment, I contemplate that EFCU 105 computes an overall energy score:

$$E(c) = 1 - \beta \frac{1}{N} \sum_{i=1}^{N} d(P_i) \quad (4)$$

where the second term $$\frac{1}{N}\sum_{i=1}^{N} d(P_i)$$

is an overall distance measure generated by ECU 116. $\beta$ is a predetermined control parameter that controls the strength of the second term in relevance to the first term.

In EFCU 105, various other distance measures, such as intensity-based distance measures or feature based distance measures, can be added to the one or more distance measures generated by ECU 116. In one embodiment, where the points are SIFT extracted feature points to each of which is attached a 128-bit feature vector describing the local geometry surrounding it, EFCU 105 computes an overall energy score which involves Euclidean distances between pairs of feature vectors for pairs of corresponding points:

$$E(c) = 1 - \beta_1 \frac{1}{N}\sum_{i=1}^{N} d(P_i) - \beta_2 \frac{1}{M}\sum_{j=1}^{M} \|f(q_{j,1}) - f(q_{j,2})\| \quad (5)$$

Here $q_j$ stands for a pair of corresponding points, with $q_{j,1}$, $q_{j,2}$ denoting the template and reference points respectively. Local or overall energy scores may also contain terms representing external forces, penalty terms, or additional perturbations.

Figure 9:
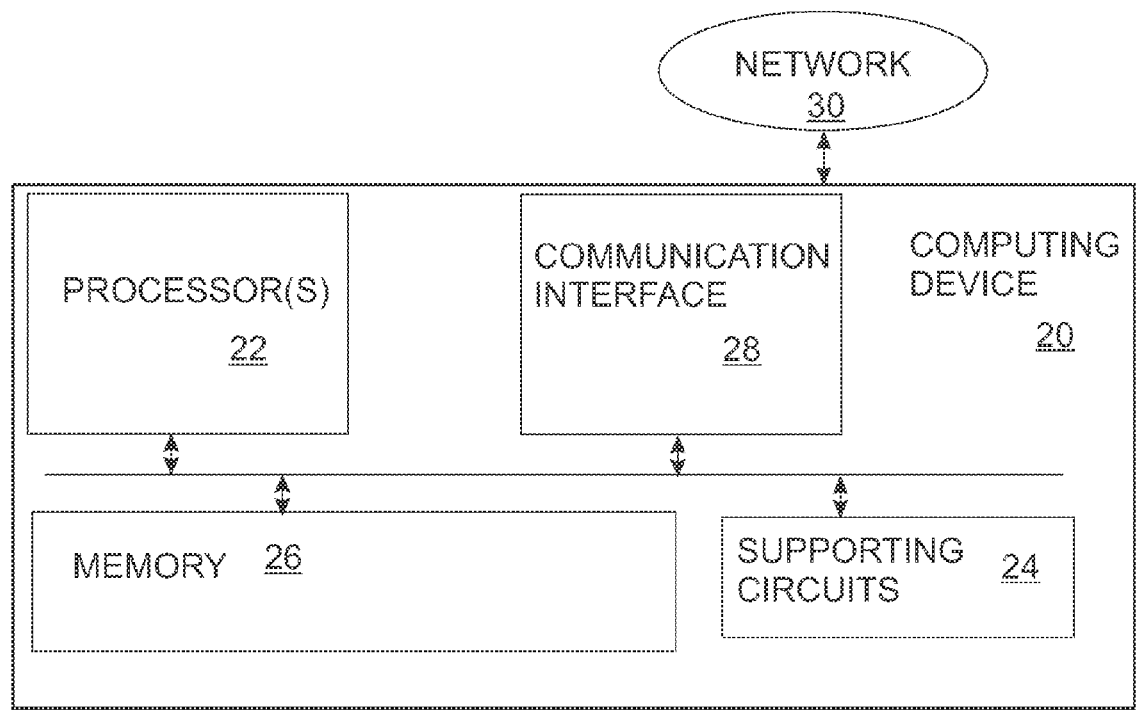
FIG. 9 is a block diagram of an exemplary computer system.
Figure 10:
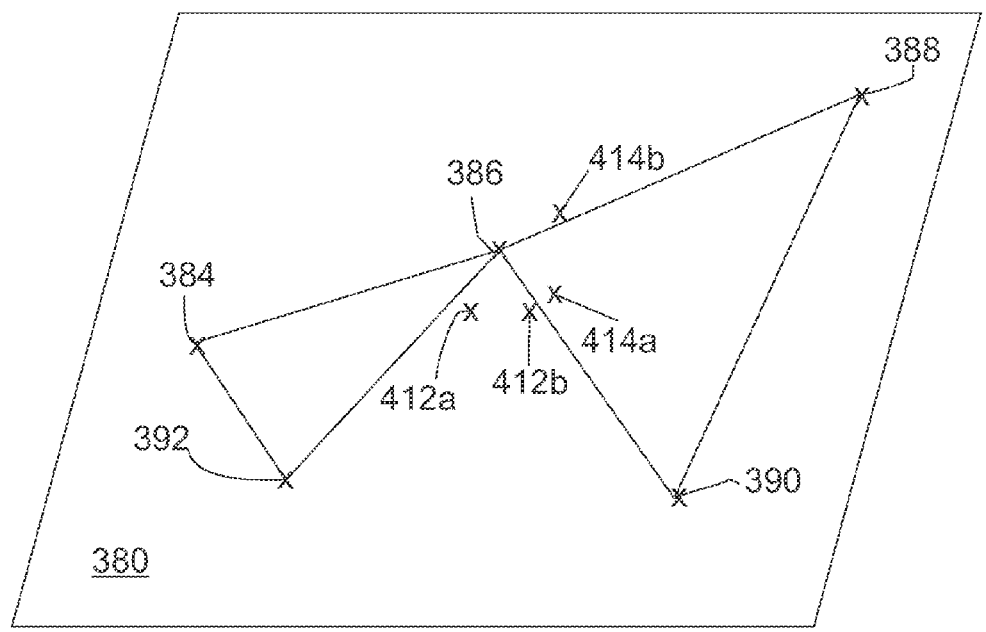
FIG. 10 is an exemplary illustration in 2D of two points-of-actions defined for two 3-combinations having one point in common.

A computing device is defined to comprise one or more general purpose digital processors, one or more memory modules, and some supporting circuits. The computer is programmed to be capable of encoding a one-to-one mapping between point sets, encoding sets, defining geometric points, computing affine transformations, computing singular values of matrices, and triangulating point sets. FIG. 9 depicts a computer 20 comprising one or more processors 22, memory modules 26, and supporting circuits 24. It may further includes a communication interface 28 that receives inputs and send outputs to an external network 30. The one or more processors 22 may be microprocessors, controllers or any other suitable type of processors for processing and computing executable instructions. Supporting circuits 24 comprise well-known circuits such as I/O controllers, power supplies, data buses, and the like. Memories 26 comprises storage devices such as read-only memory (ROM), dynamic random-access memory (DRAM), and the like. Memories 26 provides temporary storage for operation system instructions, which provides an interface between the software applications being executed and the hardware components. Memories 26 is further loaded with instructions for operating control structures (e.g., if, else, loop, etc.), computing affine transformations, matrix subtraction, triangulating point sets, and computing singular values. In some embodiment, it may further involve instructions for computing various matrix functionalities such as trace norms, principal sqare roots, and Frobenius norms. it is further loaded with data structures for the temporary storage of data structures representing, for example, one-to-one mappings, affine transformations, spatial points, triangulations, individuals or sets of combinations, and individuals or sets of spatial points. The embodiments may involve various suitable operating systems, such as Microsoft Windows®, Unix, LINUX and the like. It further provides temporary storage for the data and programming instructions for one or more units of the above described embodiments, The processors and memories may be local (e.g. a single PC), distributed (e.g. a computer cluster), or located remotely and accessed via a network or other communication link (e.g. using communication interface 28). Computer 20 may further comprise storage devices for recording instructions of computer programs into a record medium, or loading instructions from a record medium into memory. For example, such record medium may include internal hard drive, external hard drives, FLASH drives, optical disks, and cloud based storages accessible through Internet.

To each spatial point is associated its label and coordinates. In this embodiment, a label is a positive integer, and its coordinates are encoded in an array. Alternatively, a label can be any identifier as long as it uniquely identifies a point within a point set. In one embodiment, the starting memory address of a point's coordinate vector is used as the point's label. In another embodiment, a computer generated unique id (GUID) is used as the point's label. Besides being encoded into an array or a vector, one can encode the coordinates of a spatial point into various data structures, for example a customly made data structure. Blow is an exemplary illustration in the C++ programming language of a class that implements the basic aspects of points in 2D.

```
struct MyPoint{
    public:
        double a,b; //elements of the vector
        MyPoint(double a1, double a2):a(a1),b(a2){ }
        //add a second point to the current point
        inline MyPoint& operator+(const MyPoint & secondvec){
            a+=secondvec.a;
            b+=secondvec.b;
            return *this;
        }
        //subtract a second point from the current point
        inline MyPoint& operator-(const MyPoint & secondvec) {
            a-=secondvec.a;
            b-=secondvec.b;
    return *this;
        }
        //inner product
        inline double operator*(const MyPoint & secondvec) {
            return sqrt(a*secondvec.a+b*secondvec.b);
        }
};
```

In some embodiments, I contemplate that an (n+1)-combination is implemented as an integer array of fixed size (n+1), where the values are the labels of the template points. Alternatively, an (n+1)-combination can be implemented as a linked list, a stack, a suitable sequential or random access data structure, or a customly coded data structure.

In some embodiments, I contemplate that a mapping between two point sets is implemented as an integer valued array, where the indices are the labels of the template points and the values are the labels of the reference points. When a template point is isolated, it indexes into a null reference label, which is an identifier that doesn't label any reference point. Otherwise it indexes into the corresponding reference label. Implemented this way, a Cut of a cross-edge between a template point and a reference point comprises changing the value indexed by the template point's label from the reference point's label to the null reference label; and a Nit of a template point with a reference point involves changing the value indexed by the template point's label to the reference point's label.

Alternatively, a mapping can be encoded in various data structures, such as an adjacency matrix, an incidence matrix, an adjacency list, and an incidence list. It is obvious how Cut and Nit steps can be implemented accordingly if such data structures are used.

In some embodiments, I contemplate that a triangulation in 2D is implemented as an n*3 matrix, each row of which consists of the labels of the three vertices of a triangle. Similarly, in 3D, a triangulation can be implemented as an n*4 matrix, each row of which consists of the labels of the four vertices of a tetrahedron. Alternatively, there are various ways to represent a triangulation, for example the winged-edge, the quad-edge, and the half-edge data structures.

There are various ways to encode an affine transformation. In some embodiments, an affine transformation in n–D is represented as an (n+1)-by-(n+1) matrix; otherwise an affine transformation can be represented as the combination of an n-by-n matrix, which is the left sub-matrix, and a vector in n–D; alternatively an affine transformation can be represented as an array of floating point numbers, the array being the concatenation of either the columns or the rows of the affine transformation. Alternatively, an affine transformation may be customly coded so that the data structure comprises the parameters of the affine transformation.

Figure 11:
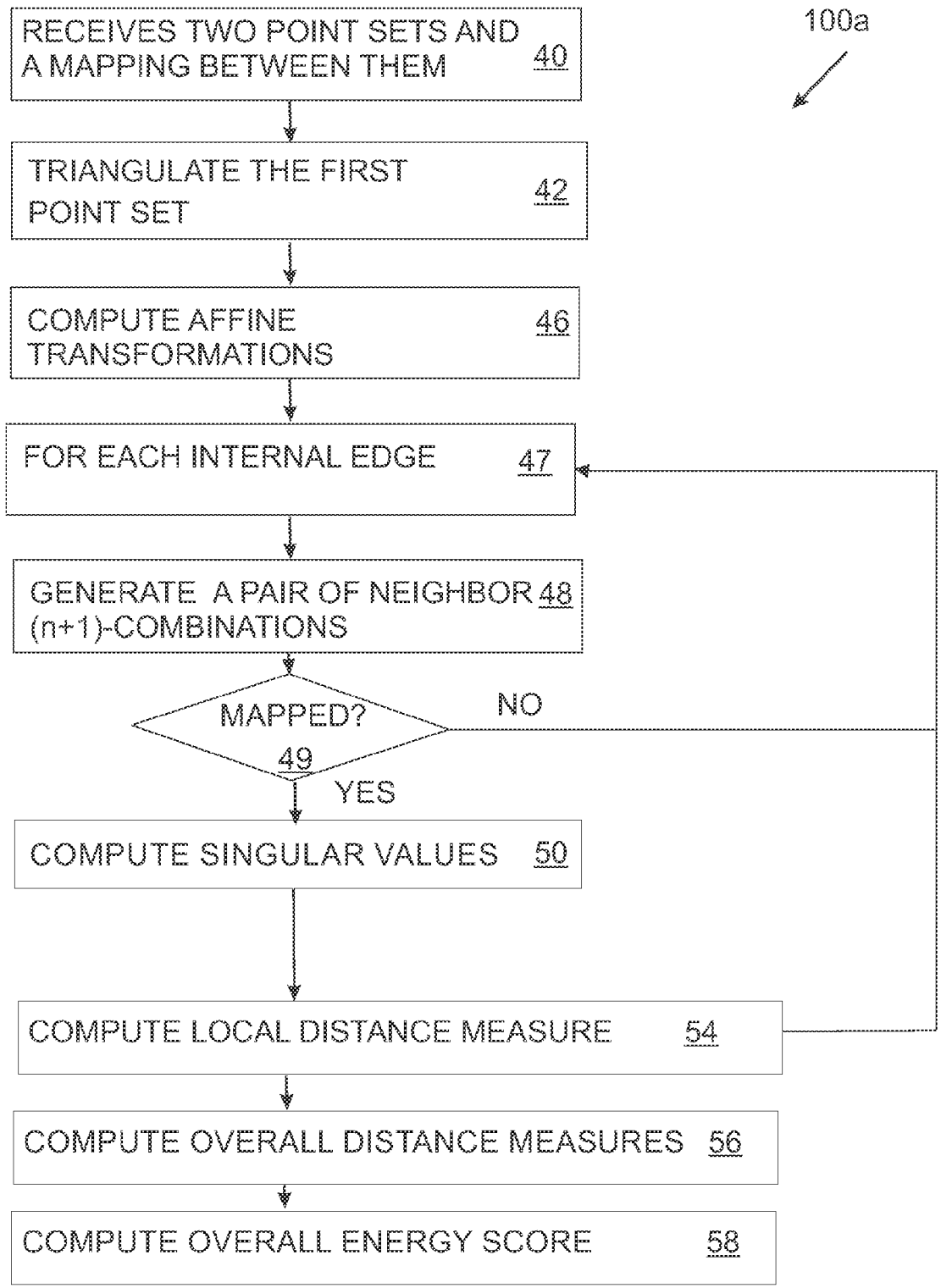
FIG. 11 is a flowchart of an exemplary process for evaluating a mapping between two spatial point sets using the matching evaluation unit shown in FIG. 2 and executed by the computer shown in FIG. 9.

Referring to FIG. 11, there is an exemplary process 100a carried out by the software system shown in FIG. 2 and the computer system shown in FIG. 9 for evaluating a configuration or a sub-configuration. At 40, MEU 104 receives two point sets and a mapping between them. To fix notation, we call one of the two point sets a template point set, and the other a reference point set. In this exemplary process, one point set is already designated the template point set and the other is already designated the reference point set. Alternatively, MEU 104 can be configured to arbitrarily chose one point set as the template point set and the other as the reference point set.

At 42, TU 106 triangulates the template point set using Delaunay triangulation in nD.

At 46, ACU 112 computes affine transformations. For each template simplex, ACU 112 checks whether all of its vertices are mapped. If the answer is yes, then it computes an affine transformation according to equation 1.

At 47, the process iterates through all internal edges of the triangulation. For each internal edge, at 48, CSU 113 creates a pair of neighbor (n+1)-combinations, which are not necessarily to be mapped.

At 49, for the pair of neighbor (n+1)-combinations selected at 48, the process checks if both of the (n+1)-combinations are mapped, if the answer is no then the process ignores the remaining steps in the loop and goes back to step 47. Otherwise, at 50, MDU 130 computes q singular values for the difference of the left sub-matrices of a pair of affine transformations computed at step 46, where the pair of affine transformations are generated from the pair of (n+1)-combinations.

At 54, DCU 132 computes a local distance measure for the pair of neighbor (n+1)-combinations, which in this exemplary process is the Ky Fan p-k norm according to equation 2.

After going through the loop for multiple times, multiple local distance measures are generated at 54 for multiple pairs of neighbor mapped 3-combinations. At 56 ECU 116 creates an overall distance measure from the multiple local distance measures according to equation 3.

Finally, at 58, an overall energy score is computed by EFCU 105. In this exemplary process, EFCU 105 creates an overall energy score according to equation 4, of which the overall distance measure created at step 56 by ECU 116 is the second term (if we ignore the control parameter and the sign).

As we have discussed earlier, for some steps there may be various alternative embodiments. For example, in another embodiment step 50 is omitted and at step 54 instead of computing the Ky Fan p-k norm according to equation 2, the trace norm of the difference of the left sub-matrices of the affine transformations is computed. In another exemplary process, at 47 and 48, instead of iterating through the internal edges of a template triangulation and generating pairs of neighbor (n+1)-combinations, the process iterates through vertices of the template triangulation and pairs of 1+-agreeable (n+1)-combinations are selected accordingly. In yet another embodiment, at 46, the DLT algorithm is used to compute affine transformations in place of equation 1.

One skilled in the art will appreciate that, for this and other processes, the steps may be implemented in different order. For example, in one embodiment, an affine transformation is computed only after a pair of neighbor mapped 3-combinations containing the associated 3-combination has been generated. Furthermore, the steps are only provided as examples. thus some steps may be optional, combined into fewer steps, or expanded into additional steps. Further, the outlined software components are provided as examples. That is, units may be combined, sub-units may be organized in different ways, or parent units may be expanded to include additional units without distracting from the essence of the disclosed embodiments.

Figure 12:
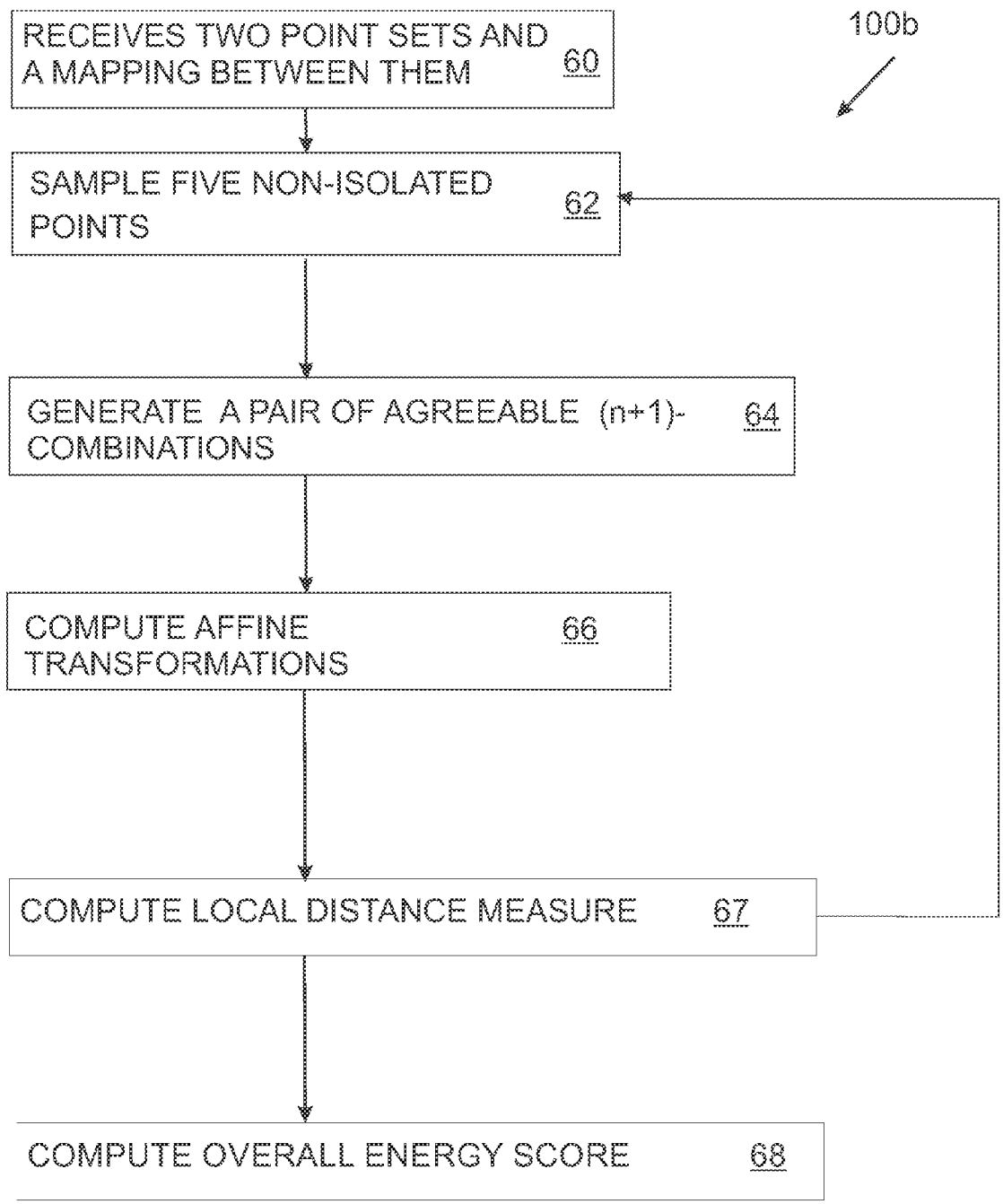
FIG. 12 is another flowchart of an exemplary process for evaluating a mapping between two spatial point sets using the matching evaluation unit shown in FIG. 2 and executed by the computer shown in FIG. 9.

Referring to FIG. 12, there is another exemplary process 100b in 2D carried out by the software system shown in FIG. 2 and the computer system shown in FIG. 9 for evaluating a configuration or a sub-configuration, where TU 106 is omitted.

At 60, MU 100 receives two spatial point sets. To fix notation, we call one of the two point sets a template point set, and the other a reference point set. In this embodiment, one point set is already designated the template point set and the other is already designated the reference point set. Alternatively, MU 100 can be configured to arbitrarily chose one point set as the template point set and the other as the reference point set At 62, the process chooses five non-isolated points randomly from the template point set such that the first, the second, and the third points are not collinear and the first, the fourth, and the fifth points are not collinear.

At 64, CSU 113 generates a pair of agreeable (n+1)-combinations, where the first (n+1)-combination consists of the first, the second, and the third points, and the second (n+1)-combination consists of the first, the fourth, and the fifth points.

At 66, ACU 112 computes the affine transformation for the mapped 3-combination consisting of the first, the second, and the third points, and computes the affine transformation for the mapped 3-combination consisting of the first, the fourth, and the fifth points.

At 67, DCU 132 computes a local distance measure for the pair of agreeable (n+1)-combinations, where the local distance measure in this exemplary process is a trace norm computed by computing first $X=A(T_1)-A(T_2)$, then computing the principal square root of $X^*X$, then computing the trace of the principal square root.

Steps 62 to 67 can be repeated for multiple times so that multiple pairs of mapped 1-agreeable (n+1)-combinations are sampled.

At 68, if there is sampled only one pair of agreeable (n+1)-combinations, equation 4 is simplified to:

$$E(c)=1-\beta d(P_i)$$

Otherwise equation 4 is used to compute an overall energy score. A similar process applies in 3D where seven non-isolated points are randomly chosen according to previous descriptions.

In an alternative embodiment in 2D, at 62, the process first choose two points randomly from the template point set such that they do not overlap, then choose two distinct points from the remaining of the template point set such that neither are in the line containing the first two points. At step 64, CSU 113 generates a pair of agreeable (n+1)-combinations, where the first (n+1)-combination consists of the first two and the third points, and the second (n+1)-combination consists of the first two and the fourth points. At 66, ACU 112 computes the affine transformation $T_1$ for the mapped 3-combination consisting of the first two and the third points, and it computes the affine transformation $T_2$ for the mapped 3-combination consisting of the first two and the fourth points. At 67, DCU 132 computes a local distance measure for the pair of agreeable (n+1)-combinations, which in this exemplary process is the Frobenius norm of $X=A(T_1)-A(T_2)$. Accordingly, a similar process applies in 3D where two distinct points are chosen after three non-coplanar points are chosen.

Figure 13:
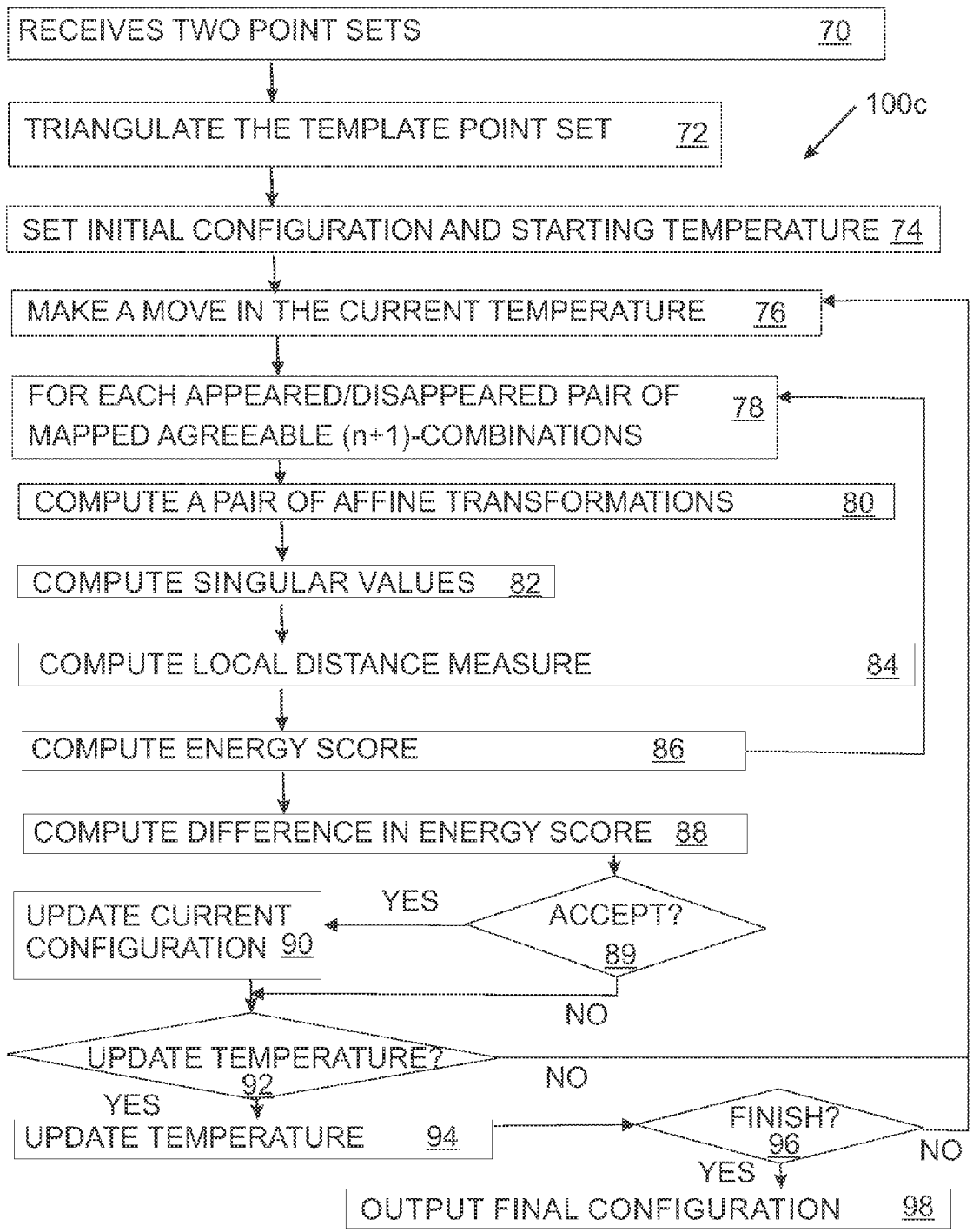
FIG. 13 is a flowchart of an exemplary process for matching two spatial point sets using the matching unit shown in FIG. 1 and executed by the computer shown in FIG. 9.

Referring to FIG. 13, there is another exemplary process 100c carried out by the software system shown in FIG. 1 and the computer system shown in FIG. 9 for matching two point sets using Simulated Annealing. This exemplary process is shown in 2D, but to convert it to 3D requires only minor changes (e.g. 3-combinations to 4-combinations, common edge to common triangle, triangles to tetrahedra, $1 \leq q \leq 2$ to $1 \leq q \leq 3$). At 70, MU 100 receives two spatial point sets. To fix notation, we call one of the two point sets a template point set, and the other a reference point set. In this embodiment, one point set is already designated the template point set and the other is already designated the reference point set. Alternatively, MU 100 can be configured to arbitrarily chose one point set as the template point set and the other as the reference point set.

At 72, TU 106 triangulates the template point set using Delaunay triangulation.

At 74, in IU 118, the initial configuration is set by a random walk in the configuration space, and a starting temperature is chosen according to $10 \max|\Delta E|$, where $\max|\Delta E|$ is obtained by recording the maximum energy score difference during a random walk in the space of configurations.

At 76, for the current temperature, MGU 120 performs a move according to moving class B as described before. From the current configuration a move generates a new configuration, which is a neighbor of the current configuration that contains some of the cross-edges of the current configuration. The Cuts of some cross-edges and the Nits of some other cross-edges lead to the appearance of some mapped 3-combinations and the disappearance of some other mapped 3-combinations in $V_1$. Consequently, if one collects all pairs of agreeable mapped 3-combinations from the new configuration, and remove from them those that are already present in the current configuration, he gets all appeared pairs of agreeable mapped 3-combinations. Similarly, if one collects all pairs of agreeable mapped 3-combinations from the current configuration, and remove from them those that are also in the new configuration, he gets all disappeared pairs of agreeable mapped 3-combinations (see "An Affine Energy Model for Image Registration Using Markov Chain Monte Carlo" by Yang and Keyes for some exemplary illustrations and descriptions of the Cut-Nit process).

Multiple local energy scores are created by looping between 78 and 86. Within each loop, a local energy score is computed for a pair of disappeared or appeared agreeable mapped 3-combinations. At 78, a pair of appeared or disappeared agreeable mapped 3-combinations $P_j$ is selected for processing. At 80, ACU 112 computes two affine transformations $T_{i,1}$, $T_{i,2}$ for the pair of neighbor mapped 3-combinations according to equation 1.

At 82, MDU 130 computes q, $1 \leq q \leq 2$ singular values of $X = A(T_1) - A(T_2)$. At 84, DCU 132 computes the Ky Fan p-k norm according to equation 2.

At 86, the Ky Fan p-k norm computed by DCU 132 is used to generate a local energy score:

$$\delta_i(1 - \alpha d(T_{i,1}, T_{i,2}, k, p)) \qquad (6)$$

where $d(T_{i,1}, T_{i,2}, k, p)$ is the Ky Fan p-k norm of the difference of the left sub-matrices of $X = T_{i,1} - T_{i,2}$, $\alpha$ is a predetermined control parameter, and $\delta_i = 1$ if it is a pair of appeared 3-combinations and $\delta_i = -1$ if it is a pair of disappeared 3-combinations.

At 88, the local energy scores for all pairs of disappeared or appeared agreeable mapped 3-combinations are summed up to get the difference in energy scores between the new configuration and the current configuration:

$$\Delta E = \sum_{i=1}^{s} \delta_i (1 - \alpha d(T_{i,1}, T_{i,2})) \qquad (7)$$

where s is the total number of pairs of appeared/disappeared neighbor mapped 3-combinations as a result of the current move.

At 89, in MSU 122, each move is accepted if $r < e^{-\Delta E/T}$, where r is a sample of a random variable uniformly distributed in [0, 1], and rejected otherwise. If the move is accepted, then at 90 the new configuration is used to update the current configuration.

At 92, the process determines whether a predetermined number of moves have been attempted at the current temperature. If the answer is yes, the current temperature is updated at 94 according to $T_{current} = T_{current} * f$, where f is a cooling factor usually in the range of [0.8, 0.999], and then the process proceeds to step 96. Otherwise the process goes back to step 76.

At 96, if the new temperature is lower than a predetermined threshold, then at 98 the process prints out the final configuration and stops. Otherwise the process goes back to step 76 to start a new move in the new temperature.

Again as we have discussed earlier, for some steps there may be various alternative embodiments. For example, in another embodiment step 82 is omitted and at step 84 instead of computing the Ky Fan p-k norm according to equation 2, the trace norm of the difference of pairs of left sub-matrices of the affine transformations are computed. In another exemplary process, at 78, instead of generating pairs of mapped agreeable (n+1)-combinations, pairs of disappeared and appeared neighbor mapped (n+1)-combinations are selected by tracking appeared and disappeared internal edges. In yet another embodiment, at 80, the DLT algorithm is used to compute the affine transformation in place of equation 1. In yet another embodiment, at 94, the temperature is updated according to $T_{current} = a - b * T_{current}$, where a is the initial temperature, and b is a decrement factor chosen in the interval [0.01; 0.2].

Here again, some steps may be implemented in different order, also various alternatives discussed before for various blocks can be employed. Further, the outlined software components are provided as examples. That is, some units may be combined, sub-units may be organized in different ways, or parent units may be expanded to include additional units without distracting from the essence of the disclosed embodiments.

I claim:

1. A system for evaluating a one-to-one mapping between a first spatial point set and a second spatial point set in nD, the system comprising:
    (a) a programmable processor; and
    (b) a memory coupled with the programmable processor and embodying information indicative of instructions that cause the programmable processor to perform operations comprising:
        receiving a first and a second spatial point sets in nD and a one-to-one mapping between the two spatial point sets;
        generating a pair of mapped agreeable (n+1)-combinations in the first point set;
        computing two affine transformations that transform said pair of mapped agreeable (n+1)-combinations to correspondents in the second point set;
        computing the difference of the left sub-matrices of said two affine transformations;
        computing a local distance measure based on said difference.

2. The system in claim 1, further comprising computing one or more largest singular values of said difference, and said computing a local distance measure based on said difference comprises computing the Ky Fan p-k norm using the k largest singular values of said one or more largest singular values.

3. The system in claim 1, wherein said computing a local distance measure based on said difference comprises computing the trace norm of said difference.

4. The system in claim 1, wherein said computing a local distance measure based on said difference comprises computing the Frobenius norm of said difference.

5. The system in claim 1, further comprising triangulating the first point set to obtain a template triangulation, and said generating a pair of mapped agreeable (n+1)-combinations in the first point set comprises generating a pair of mapped agreeable (n+1)-combinations in the first point set based on said template triangulation.

6. A method of using a computer processor to evaluate a one-to-one mapping between a first spatial point set and a second spatial point set in nD, the method comprising:

(a) receiving a first and a second spatial point sets in nD and a one-to-one mapping between the two spatial point sets;
(b) using said computer processor to generate a pair of mapped agreeable (n+1)-combinations in the first point set;
(c) using said computer processor to compute two affine transformations that transform said pair of mapped agreeable (n+1)-combinations to correspondents in the second point set;
(d) using said computer processor to compute the difference of the left sub-matrices of said two affine transformations;
(e) using said computer processor to compute a local distance measure based on said difference.

7. The method of claim 6, further comprising using said computer processor to compute one or more largest singular values of said difference, wherein step (e) comprises using said computer processor to compute the Ky Fan p-k norm using the k largest singular values of said one or more largest singular values.

8. The method of claim 6, wherein step (e) comprises using said computer processor to compute the trace norm of said difference.

9. The method of claim 6, wherein step (e) comprises using said computer processor to compute the Frobenius norm of said difference.

10. The method of claim 6, further comprising using said computer processor to triangulate the first point set to obtain a template triangulation, wherein step (b) comprises using said computer processor to generate a pair of mapped agreeable (n+1)-combinations in the first point set based on said template triangulation.

11. A computer readable storage medium tangibly embodying a computer readable program code having computer readable instructions which when implemented, cause a computer to carry out the steps of a method comprising:
(a) receiving a first and a second spatial point sets in nD and a one-to-one mapping between the two spatial point sets;
(b) generating a pair of mapped agreeable (n+1)-combinations in the first point set;
(c) computing two affine transformations that transform said pair of mapped agreeable (n+1)-combinations to correspondents in the second point set;
(d) computing the difference of the left sub-matrices of said two affine transformations;
(e) computing a local distance measure based on said difference.

12. The computer readable storage medium of claim 11, further comprising computing one or more largest singular values of said difference, and step (e) comprises computing the Ky Fan p-k norm using the k largest singular values of said one or more largest singular values.

13. The computer readable storage medium of claim 11, wherein step (e) comprises computing the trace norm of said difference.

14. The computer readable storage medium of claim 11, wherein step (e) comprises computing the Frobenius norm of said difference.

15. The computer readable storage medium of claim 11, further comprising triangulating the first point set to obtain a template triangulation, and step (b) comprises generating a pair of mapped agreeable (n+1)-combinations in the first point set based on said template triangulation.

16. A system for evaluating a one-to-one mapping between a first spatial point set and a second spatial point set in nD, the system comprising:
(a) means for receiving a first and a second spatial point sets in nD and a one-to-one mapping between the two spatial point sets;
(b) means for generating a pair of mapped agreeable (n+1)-combinations in the first point set;
(c) means for computing two affine transformations that transform said pair of mapped agreeable (n+1)-combinations to correspondents in the second point set;
(d) means for computing the difference of the left sub-matrices of said two affine transformations;
(e) means for computing a local distance measure based on said difference.

17. The system in claim 16, further comprising means for computing one or more largest singular values of said difference, wherein step (e) comprises means for computing the Ky Fan p-k norm using the k largest singular values of said one or more largest singular values.

18. The system in claim 16, wherein step (e) comprises means for computing the trace norm of said difference.

19. The system in claim 16, wherein step (e) comprises means for computing the Frobenius norm of said difference.

20. The system in claim 16, further comprising means for triangulating the first point set to obtain a template triangulation, wherein step (b) comprises means for generating a pair of mapped agreeable (n+1)-combinations in the first point set based on said template triangulation.

* * * * *